(12) United States Patent
Takeda

(10) Patent No.: US 6,660,960 B2
(45) Date of Patent: Dec. 9, 2003

(54) METHOD FOR MANUFACTURING GOLF CLUB

(75) Inventor: Hitoshi Takeda, Tsubame (JP)

(73) Assignee: K. K. Endo Seisakusho, Niigata-Ken (JP)

( * ) Notice: Subject to any disclaimer, the term of this patent is extended or adjusted under 35 U.S.C. 154(b) by 0 days.

(21) Appl. No.: 10/266,051

(22) Filed: Oct. 7, 2002

(65) Prior Publication Data

US 2003/0029846 A1 Feb. 13, 2003

Related U.S. Application Data

(60) Continuation-in-part of application No. 09/896,622, filed on Jun. 29, 2001, which is a division of application No. 09/538,191, filed on Mar. 30, 2000, now Pat. No. 6,517,448.

(30) Foreign Application Priority Data

Dec. 28, 1999 (JP) .............................. 11-375426
Mar. 30, 2000 (JP) ....................... 2000-094901
Dec. 28, 2001 (JP) ....................... 2001-399488

(51) Int. Cl.$^7$ ................................. B23K 26/00
(52) U.S. Cl. ............................. 219/121.64; 219/121.85
(58) Field of Search .................. 219/121.64, 121.85, 219/121.63; 473/305, 324

(56) References Cited

U.S. PATENT DOCUMENTS

| 5,261,663 A | * | 11/1993 | Anderson | 273/78 |
| 5,403,007 A | * | 4/1995 | Chen | 273/173 |
| 5,779,560 A | * | 7/1998 | Buck et al. | 473/342 |
| 5,961,394 A | * | 10/1999 | Minabe | 473/305 |
| 6,238,300 B1 | * | 5/2001 | Igarashi | 473/324 |

* cited by examiner

Primary Examiner—M. Alexandra Elve
(74) Attorney, Agent, or Firm—Quarles & Brady LLP

(57) ABSTRACT

A golf club with an enhanced degree of freedom with respect to design, and a method for manufacturing the same. A head 1 is formed with a face 3 on a front face, a cavity 9 on a rear face and a shaft attachment portion 8 on one side, to which is connected a shaft 2. If a maximum height of a bottom surface 9A of the cavity 9 in the top-to-sole direction is denoted by H1, and a maximum width thereof in the toe-to-heel direction is denoted by W1, the cavity 9 is formed to satisfy an inequality: $H1/W1 \geq 0.6$. Further, if a maximum height of the face 3 is denoted by H2, then the cavity 9 is formed to satisfy an inequality: $0.7 \leq H1/H2 \leq 0.85$. Thus, the face 3 can be easily resiliently bent at the time of striking balls, thereby developing a greater repulsive force, elongating traveling distances of balls.

5 Claims, 20 Drawing Sheets

F I G. 4
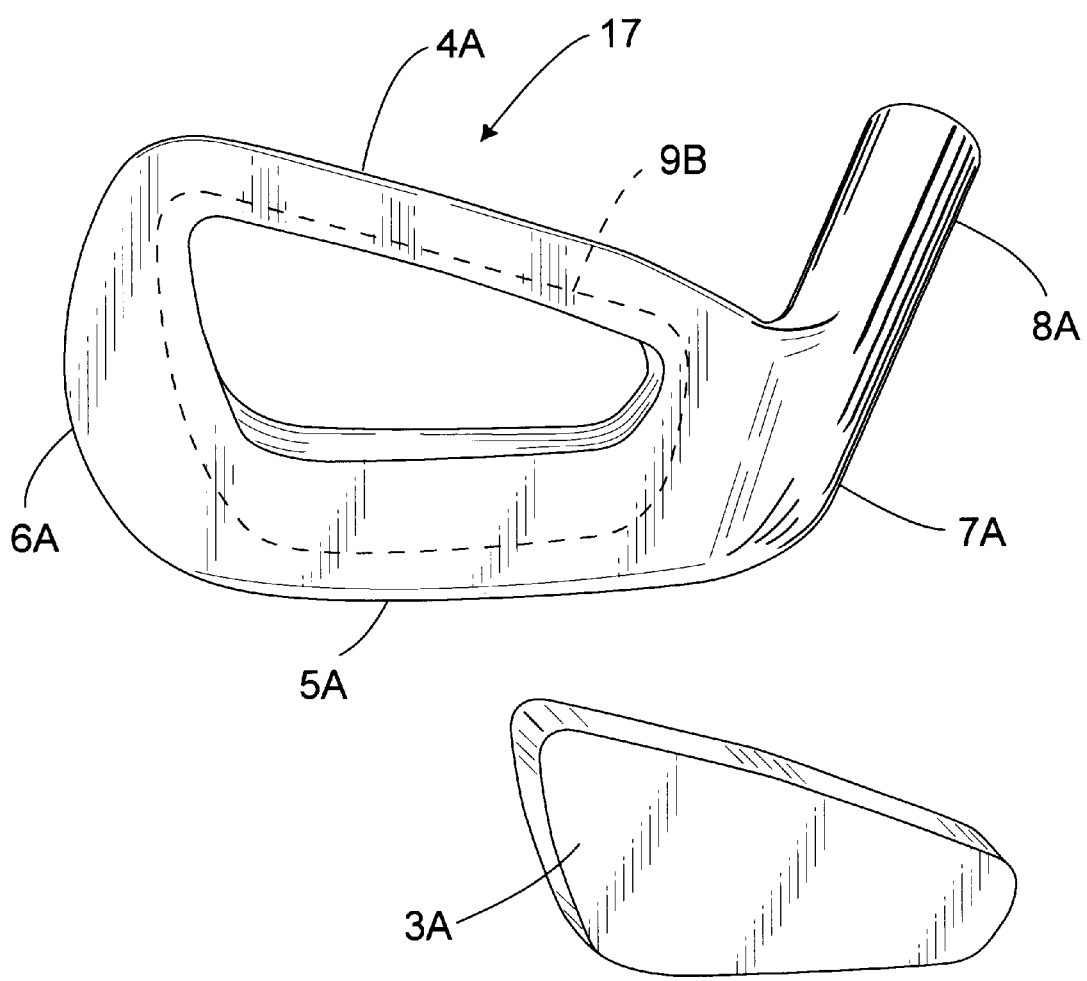

F I G. 13a
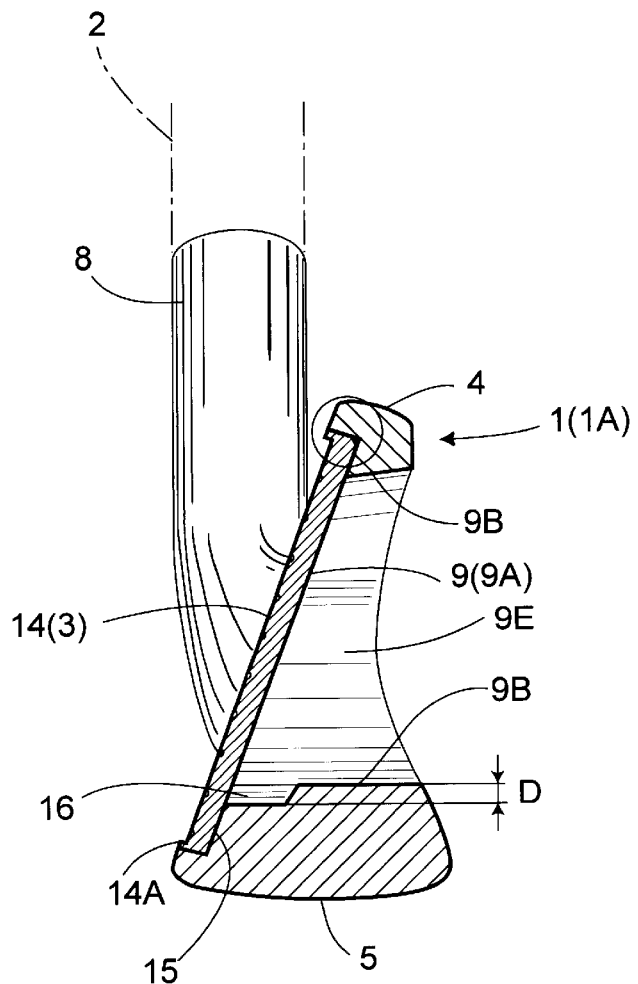
F I G. 13b
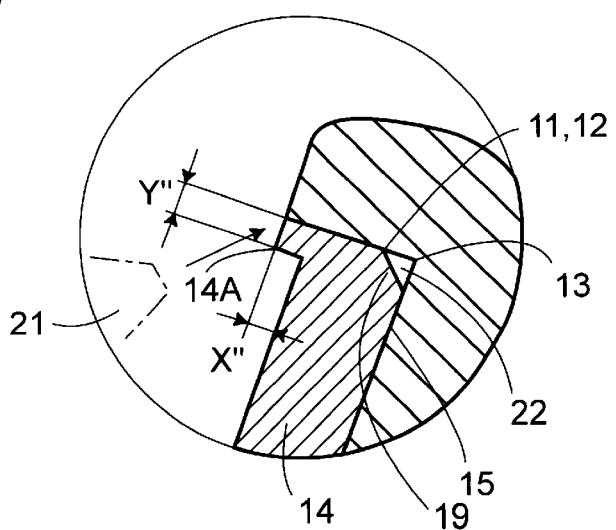

METHOD FOR MANUFACTURING GOLF CLUB

CROSS REFERENCE TO RELATED APPLICATIONS

This application is a continuation-in-part application of U.S. Ser. No. 09/896,622 filed on Jun. 29, 2001, now pending, which is a divisional application of U.S. Ser. No. 09/538,191 filed on Mar. 30, 2000 now U.S. Pat. No. 6,517,448.

BACKGROUND OF THE INVENTION

1. Field of the Invention

The present invention relates to a method for manufacturing a golf club.

2. Prior Art

As disclosed in Japanese Registered Patent Publication No.2560272, it is known art to provide an iron golf club which comprises a face member; a head body having an aperture on a front surface for securing the face member thereto, a cavity on a rear surface and a shaft attachment portion on one side; and a shaft connected thereto.

Recently, the main currents of iron golf clubs have been directed to the use of a cavity-back type head. The cavity-back configuration is aimed at enlarging a moment of inertia by concaving a middle portion of a rear face of a head so as to distribute the weight toward a periphery thereof, thus decreasing the deviation of traveling directions of balls caused by so-called off-center shots. According to conventional golf clubs, club heads are relatively long in the toe-to-heel direction, and thus, cavities thereof eventually become too long in the same direction, so that there is a problem that it is difficult to obtain a great repulsive force by resiliently bending a face of the head.

Further, an improved cavity-back type head with an undercut configuration is also known art. Such undercut configuration is aimed at making the center of gravity deeper by further hollowing a cavity toward the sole direction, which also contributes to enlarging a resiliently bending area on a face, improving a repulsive force against balls.

For methods of manufacturing a head with such undercut configuration, an insert die method wherein an insert die is used as a partial die for a cavity forming portion, a machining method wherein a golf club with a face on a front surface and a cavity on a rear surface is produced by machining, said cavity being machined from a rear side to form the undercut configuration.

According to conventional methods, however, there are limitations to the depth and configuration to be hollowed. Namely, according to the insert die method, the insert die must be removed after forming, but too deep undercut disenables the removal of the insert die. Further, according to the machining method in which machining is performed from a rear surface of a head, machining tools such drills often do not reach the depth of a cavity and is likely to damage other portions. In other words, according to these conventional methods, the undercut configuration is not free to form, thus leading to the restricted degree of freedom relative to the positional setting of the center of gravity of a head, making it difficult to insure an effective configuration and area on a face which is to be resiliently bent.

Further, iron golf clubs with a faceplate joined to a head body also have been known art. For example, as shown in FIG. 20, a head 51 may comprise a face portion 53 as a faceplate forming a front face 52 and a head body 55 provided with a shaft connecting portion 54 on one side. The surface of the face 52 of the head body 55 is formed with a recess portion 56 for fitting the face portion 53 therein by machining. After fitting the face portion 53 into the recess portion 53, a joint portion 57 on the surface of the face 52 is welded, so that the face portion 53 and the head body 55 are joined together.

In that case, however, it is imperative to precisely machine the recess portion 56 on the head body 55 so that the face portion 53 may be fitted into the recess portion 56 without a gap. Therefore, higher degree of precision in machining has been required. Further, due to the joint portion 57 being present on the surface of the face 52, there have been constraints that score lines 58 must be formed only inside of the joint portion 57. Moreover, the appearance of the face 52 has been impaired due to the presence of the joint portion 57 on the surface of the face 52. Still further, when forming the recess portion 56, there has been a problem that a gap is prone to be formed in a portion where a rear surface of the face portion 53 abuts against a front surface of the head body 55.

SUMMARY OF THE INVENTION

Accordingly, it is a main object of the present invention to provide method for manufacturing a golf club with a larger degree of freedom in designing the same so that a face may be easily bent resiliently and a head may have a lowered center of gravity.

It is another object of the present invention to provide a golf club with a face portion joined to a head body, which is easy to machine, free from a gap formed in a portion where the face portion abuts against the head body, subject to no positional constraints when forming score lines, and excellent in appearance of a face surface.

To attain the above objects, there is provided, in accordance with a first aspect of the invention, a method for manufacturing a golf club, the golf club comprising: a face member; a head body having an aperture on a front surface for securing the face member thereto a cavity formed on a rear surface and a shaft attachment portion at one side; and a shaft connected to the head body, the method comprising the steps of:

inserting a mechanical processing unit from a front side of the head body through the aperture to process an inner lower surface of the cavity to form an undercut portion formed by concaving a front side of the inner surface downwards; and then, securing the face member to the aperture by means of laser beam welding or the like.

According to another aspect of the invention, there is provided a method for manufacturing a golf club, the golf club comprising: a face member, a head body having an aperture on a front surface for securing the face member, a hollow interior on a rear and a shaft connected to the head body, the method comprises the steps of:

inserting a mechanical processing unit from a front side of the head body through the aperture to form an undercut portion by concaving a front side of an inner lower surface of the hollow interior downwards; and then, securing the face member to the aperture by means of laser beam welding, According to the method, a mechanical processing unit can be inserted deep into the aperture without being disturbed by other portions when forming the undercut portion, and thus the degree of freedom with respect to machine processing can be enhanced and the undercut portion can be formed deeper. As a result, the configuration and area of the face are subjected to no restrictions associated with the forming of the undercut portion.

Also according to the method, as it is possible to form the undercut portion deeper, there can be provided a high performance golf club having such a deepened center of gravity and an enlarged sweet area and thus allowing golf balls to be raised more easily. Furthermore, as the undercut portion is formed by deeply concaving a front side of an inner lower surface of the cavity downwards, it is possible to reduce an area for a rear face of the face member to contact the head body. Thus, it is possible to warp or bent the face more efficiently, so that a greater repulsive force is developed to elongate traveling distances of balls.

According to a further aspect of the invention, there is provided a method for manufacturing a golf club, the golf club comprising: a head and a shaft connected to the head, the head being provided with a face on a front surface and a shaft connecting portion on one side, the method comprising the step of joining a face portion that is to form the face to a head body that is to be joined to a rear surface of the face portion by laser welding a peripheral edge portion of the head body.

According to the method, there can be provided a golf club which is easy to machine, free from a gap formed in a portion where the face portion abuts against the head body, subject to no positional constraints when forming score lines, and excellent in appearance of a face surface.

BRIEF DESCRIPTION OF THE DRAWINGS

Other objects, features and advantages of the invention will be apparent to those skilled in the art from the following description of the preferred embodiments of the invention, wherein reference is made to the accompanying drawings, of which:

FIG. 4 is an exploded perspective view showing a prototype of a head in accordance with a second embodiment of the invention.

FIG. 13a is a section showing a fifth embodiment of the invention, while FIG. 13b a partially enlarged section thereof.

DESCRIPTION OF PREFERRED EMBODIMENTS

Hereinafter are described embodiments of the present invention with reference to the attached drawings.

Figure 1:
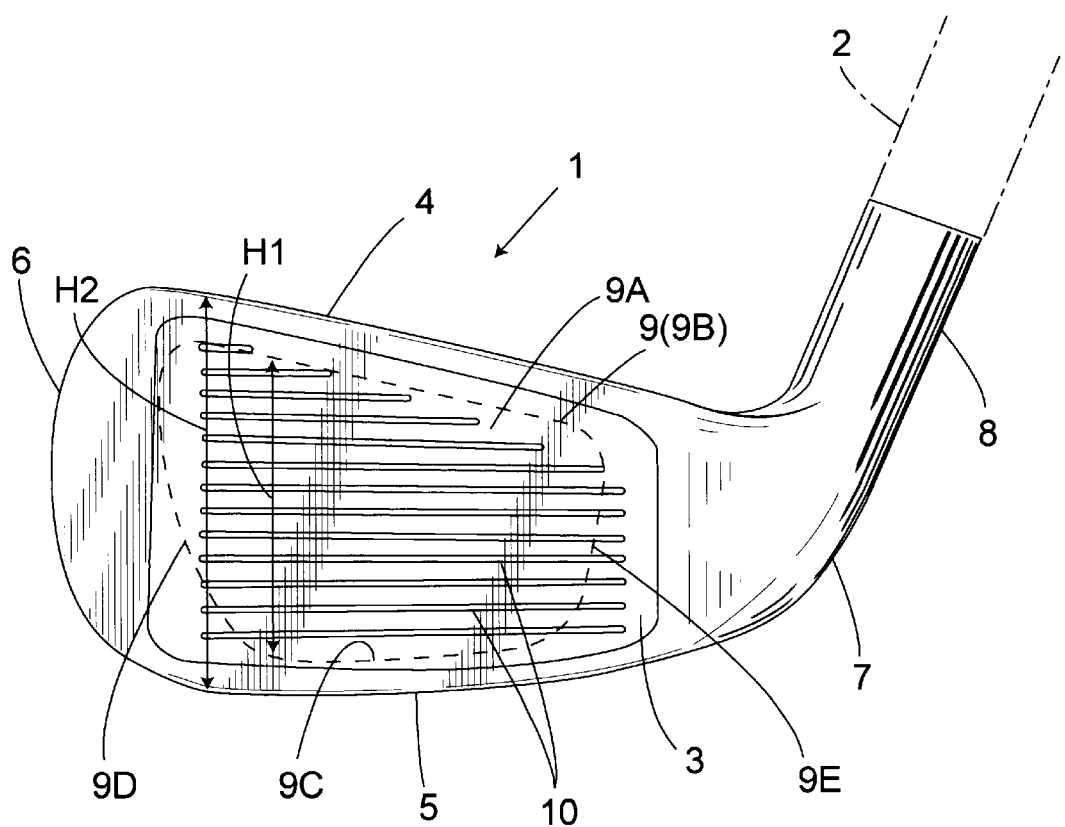
FIG. 1 is a front view showing a first embodiment of the invention.
Figure 2:
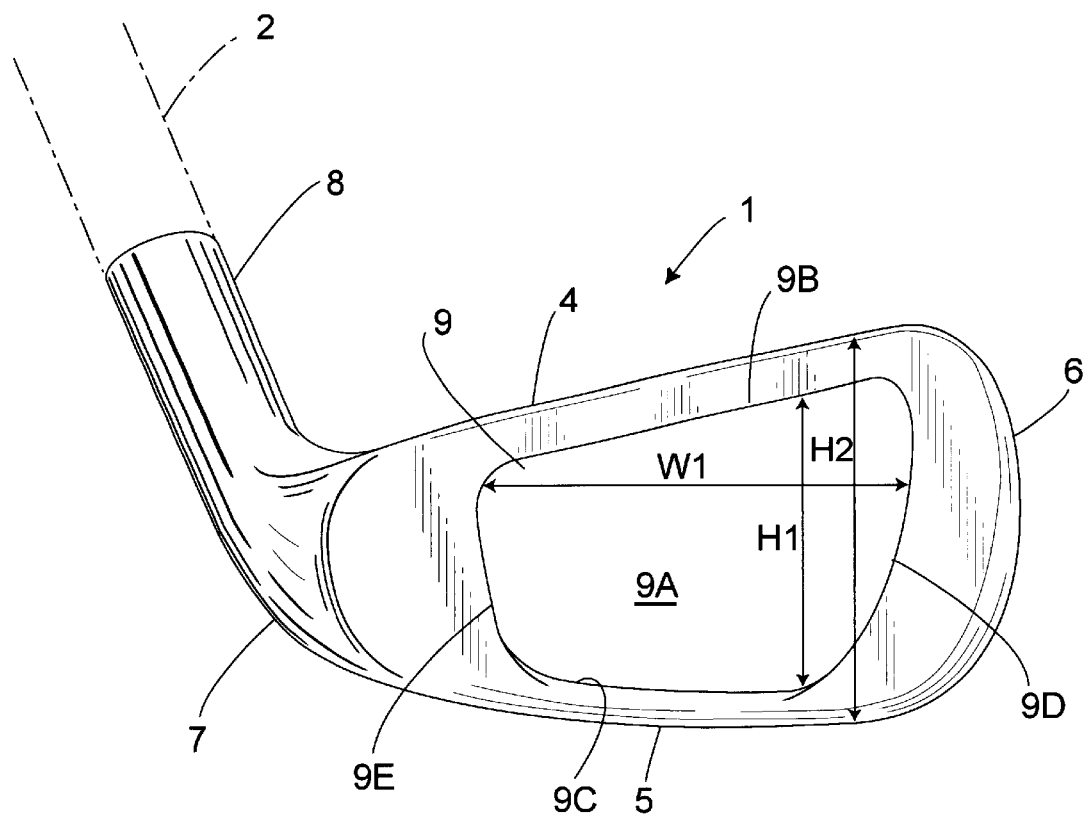
FIG. 2 is a rear view showing a first embodiment of the invention.
Figure 3:
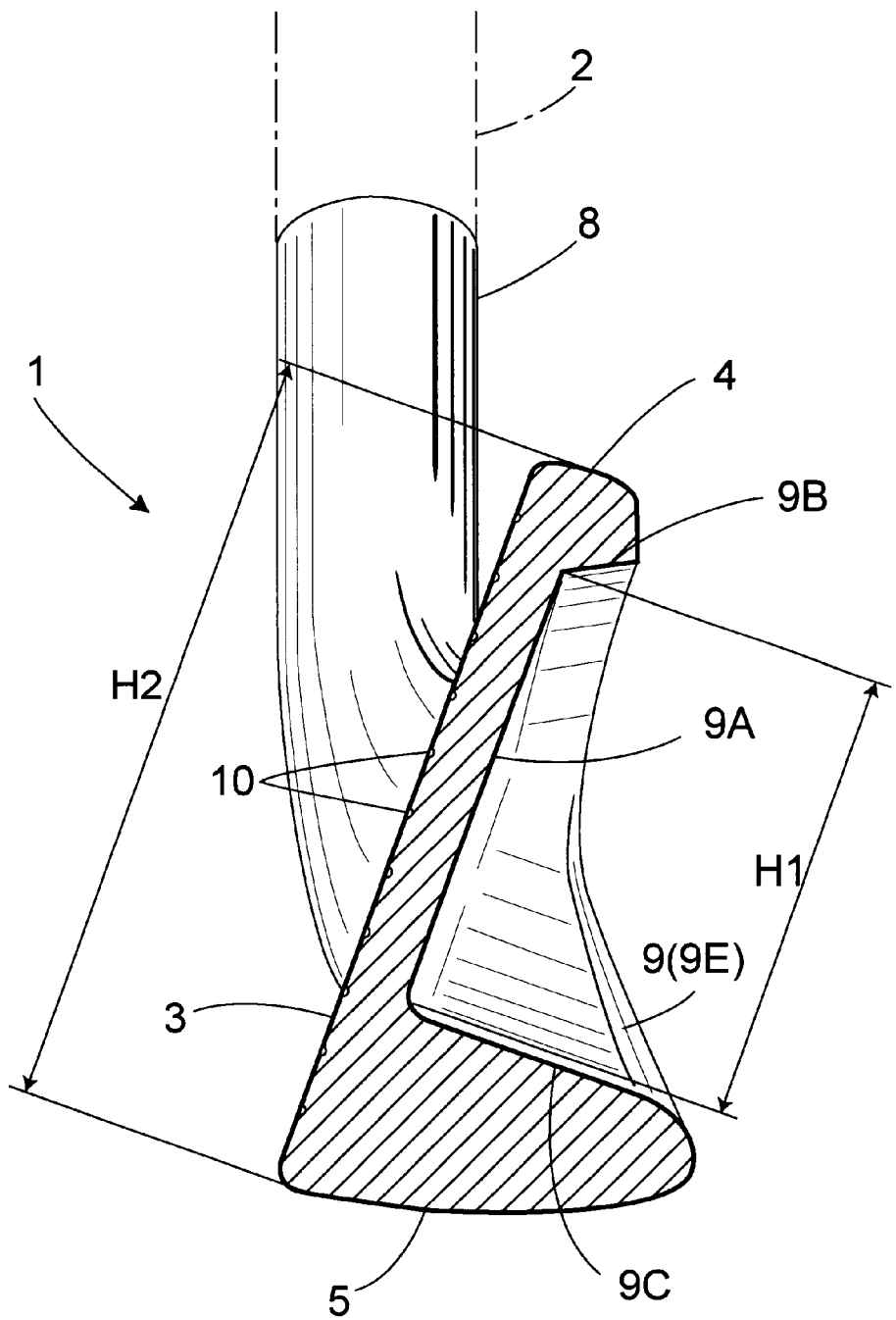
FIG. 3 is a section showing a first embodiment of the invention.
Figure 5:
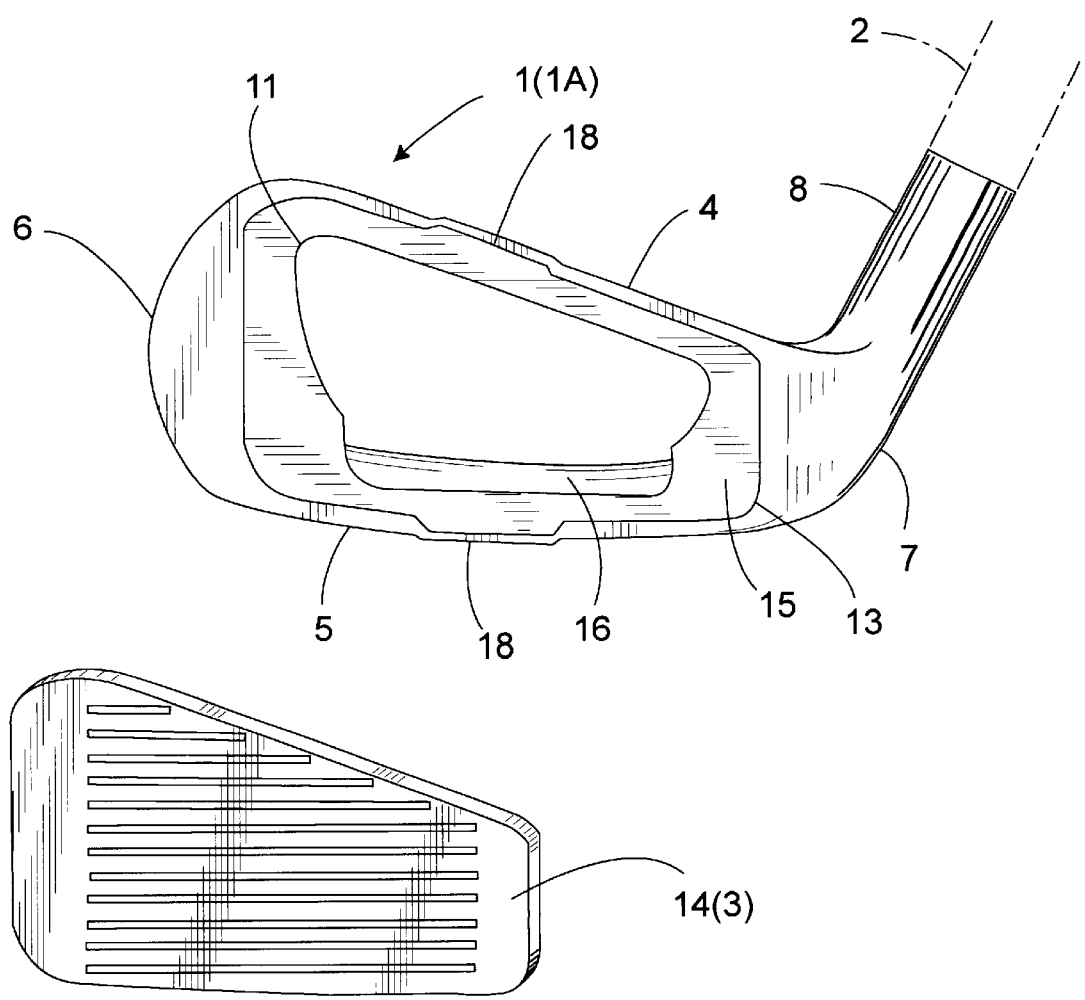
FIG. 5 is an exploded perspective view of the head of FIG. 4, seen from a front side.
Figure 6:
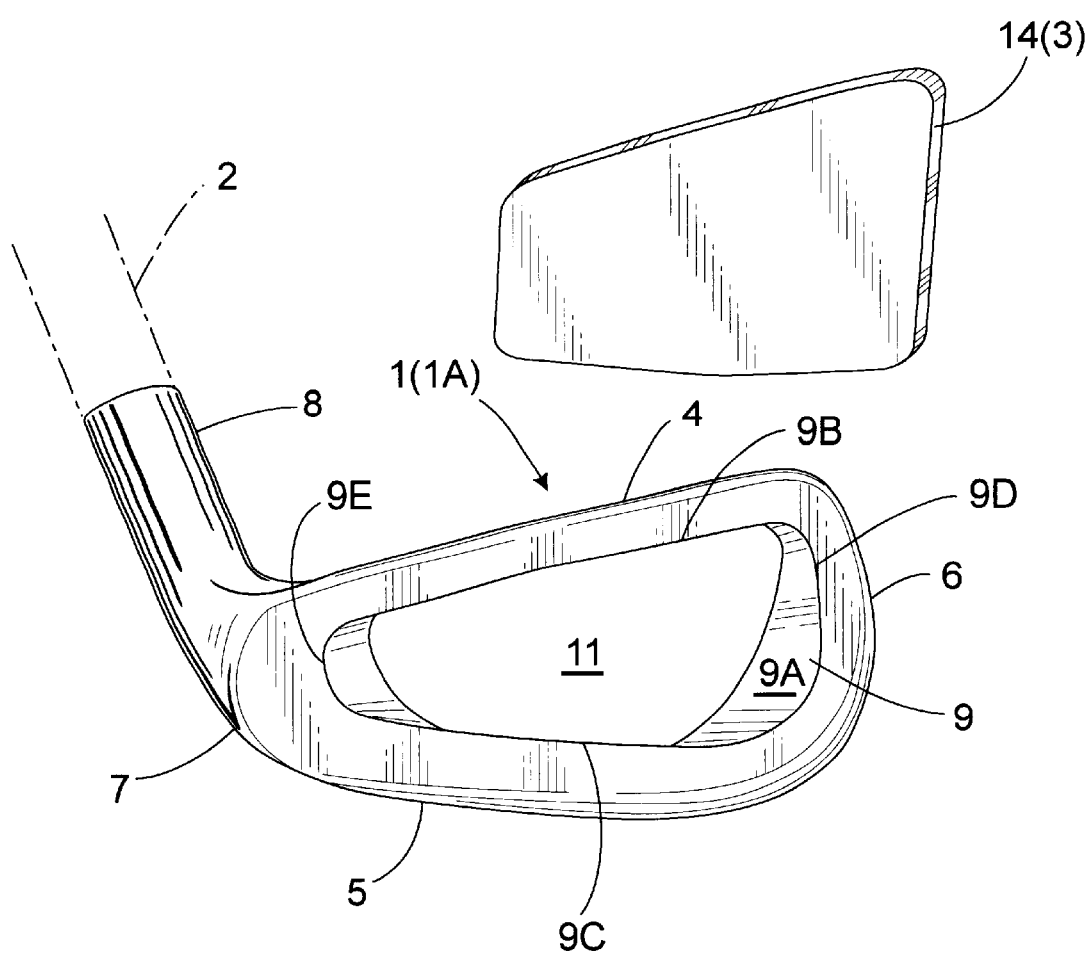
FIG. 6 is an exploded perspective view of the head of FIG. 4, seen from a rear side.
Figure 7:
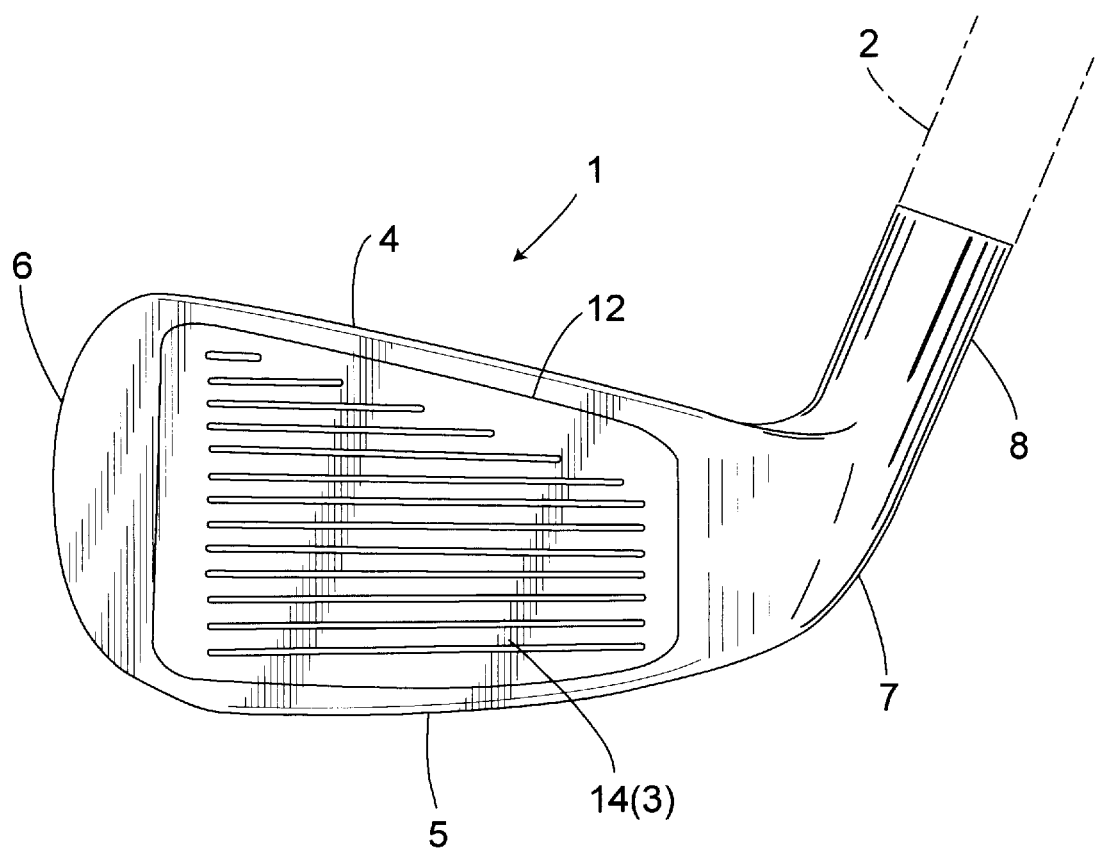
FIG. 7 is a front view showing a second embodiment of the invention.

In FIGS. 1 to 3 showing an iron golf club of a first embodiment of the invention, the iron golf club comprises a forged iron head 1 and a shaft 2, said head 1 being made of nickel-beryllium alloy, stainless steel or the like, formed on a front with a face 3 for striking balls (not shown), while a top 4 at an upper part of the face 3, a sole 5 at a lower part thereof, a toe 7 at one side, and a heel 7 at the other side, are provided, respectively. From the heel 7 extends obliquely upwards a shaft attachment portion 8 or a so-called hosel, to which is connected a lower end of the shaft 2.

Further, the rear surface of the head 1 is formed with a cavity 9, thus distributing the weight toward its periphery to thereby enlarge a moment of inertia. The cavity 9 is formed with a bottom surface 9A opposite to the face 3, an upper inner surface 9B at an upper side, a lower inner surface 9C at a lower side, a first inner side surface 9D at a first side and a second inner side surface 9E at a second side, respectively. Incidentally, reference numeral 10 designates grooves formed on the face 3, which are called score lines.

If the maximum height defined in the top-to-sole direction on the bottom surface 9A of the said cavity 9, namely, the maximum distance between the upper inner surface 9B and the lower inner surface 9C is denoted by H1, while the maximum length defined in the toe-to-heel direction on the surface 9A thereof, namely, the maximum distance between the first inner side surface 9D and the second inner side surface 9E is denoted by W1, then, the cavity 9 is formed so as to satisfy H1/W1 □≧0.6. Preferably, this H1 to W1 ratio is indicated by an inequality: 0.6≦□ H1/W1 ≦0.9, more preferably by 0.65≦H1/H2≦0.85, in which all or a part of iron golf clubs may be formed to take substantially the same H1 to W1 ratio, or otherwise, they may be formed to take varying ratios depending on a club number, such as ratios which increase as the club number increases.

As follows are more specific H1/W1 ratios for each club number in accordance with the present embodiment of the invention, in which parenthesized values are those of conventional iron golf clubs:

3rd iron: 0.69 (0.56)
4th iron: 0.69 (0.56)
5th iron: 0.75 (0.56)
6th iron: 0.75 (0.56)
7th iron: 0.76 (0.56)
8th iron: 0.78 (0.59)
9th iron: 0.81 (0.59)

Further, if the maximum height of the face 3, namely, the maximum distance between the top 4 and the sole 5 is denoted by H2, then, the cavity 9 is formed so as to satisfy an inequality: $0.7 \leq H1/H2 \leq 0.85$. Preferably, this H1 to H2 ratio may be indicated by another inequality: $0.75 \leq H1/H2 \leq 0.85$, in which all or a part of iron golf clubs may be formed to take substantially the same H1 to H2 ratio, or otherwise, they may be formed to take varying ratios depending on a club number.

As follows are more specific H1/H2 ratios for each club number in accordance with the present embodiment of the invention, in which parenthesized values are those of conventional iron golf clubs:

3rd iron: 0.80 (0.69)
4th iron: 0.78 (0.69)
5th iron: 0.81 (0.68)
6th iron: 0.80 (0.67)
7th iron: 0.79 (0.65)
8th iron: 0.79 (0.65)
9th iron: 0.81 (0.64)

As is apparent from the foregoing, a golf club according to a first aspect of the embodiment of the invention comprises the head 1 having the face 3 on a front surface, the cavity 9 on a rear surface and the shaft attachment portion 8 on one side; and the shaft 2 connected to the shaft attachment portion 8, wherein said cavity 9 is formed to satisfy the inequality $H1/W1 \geq 0.6$, assuming that the maximum height defined in the top-to-sole direction on the bottom surface 9A of the cavity 9 is denoted by HI, while the maximum length defined in the toe-to-heel direction on the surface 9A thereof is denoted by W1.

Accordingly, due to the H1 to W1 ratios being larger than those of conventional iron golf clubs, the cavity 9 is widened toward the top-to-sole direction, so that the configuration of the bottom surface 9A of the cavity 9 becomes more like a square than those of conventional heads, thereby enabling the face 3 to be more easily warped or bent, so that a greater repulsive force is developed to elongate traveling distances of balls.

Further, according to a second aspect of the embodiment of the invention, the cavity 9 is formed to satisfy the inequality $0.7 \leq H1/H2 \leq 0.85$, assuming that the maximum height defined in the top-to-sole direction on the bottom surface 9A of the cavity 9 is denoted by H1, while the maximum height of the face 3 is denoted by H2, so that the H1 to H2 ratios are larger than those of conventional iron golf clubs. Accordingly, the cavity 9 is widened toward the top-to-sole direction, thereby enabling the face 3 to be more easily warped or bent, so that a greater repulsive force is developed to elongate traveling distances of balls. Specifically, if the H1/H2 ratios are less than 0.7, the above-described warping effect becomes too little, while if more than 0.85, the thickness becomes too small at the top 4 and the sole 5, thus causing a problem relating to the strength of the head.

Next, a second embodiment of the invention is described with reference to FIGS. 4 to 10, in which the same portions as those described in the foregoing embodiment are designated by the same reference numbers, and their repeated descriptions are omitted.

As shown in the drawings, the head 1 of this embodiment comprises: a head body 1A which is formed on a front with an aperture 11 opposite to the face 3 and is provided with the shaft attachment portion 8 connected to one side, said aperture 11 being communicating with the bottom surface 9A of the cavity 9; and a face plate 14 as a face member for securely fitting the same into the aperture 11. A periphery 12 of the aperture 11 defines a larger area than an area defined by the upper inner surface 9B, the lower inner surface 9C, the first side surface 9D and the second side surface 9E, having a stepped peripheral portion 13 along the same. The face plate 14 is fitted into the aperture 11 with a rear surface of the face plate 14 abutting to a bottom surface 15 of the stepped peripheral portion 13.

Further, an undercut portion 16 is formed near the face 3 on the inner lower surface 9C of the cavity 9. This undercut portion 16 is a recess formed by concaving the inner lower surface 9C toward the sole 5, extending from the first inner side surface 9D toward the second inner side surface 9E, in which its depth D, namely a distance D between the deepest portion of the undercut portion 16 and the inner lower surface 9C is 7 mm or above, preferably 10 mm or above.

Next, a manufacturing method is explained. As shown in FIG. 4, a metallic material such as nickel-beryllium alloy, stainless steel or soft iron is preliminarily formed into a head prototype 17, using a die (not shown). The head prototype 17 is formed with a prototypical face 3A, a prototypical top 4A, a prototypical sole 5A, a prototypical toe 6A, a prototypical heel 7A, a prototypical shaft attachment portion 8A and a prototypical cavity 9B, each corresponding to the aforesaid face 3, top 4, sole 5, toe 6, heel 7, shaft attachment portion 8 and cavity 9, respectively. Then, only the prototypical face 3A of the head prototype 17 is hollowed, while the head prototype 17 and the face 3A thereof is further processed by forging, rolling, machining, grinding and the like, to thereby form the head body 1A and the face plate 14.

Figure 8:
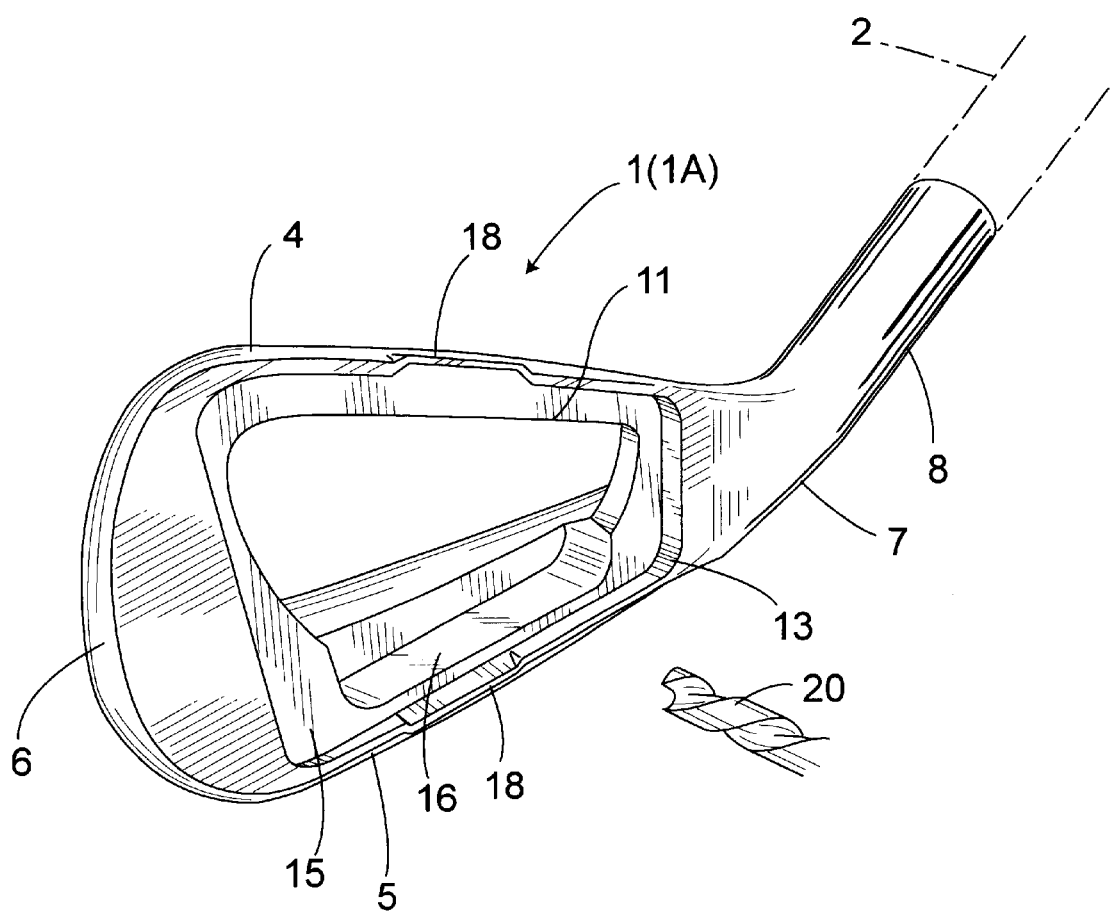
FIG. 8 is a perspective view showing a golf club which is under machining process in accordance with a second embodiment of the invention.
Figure 9:
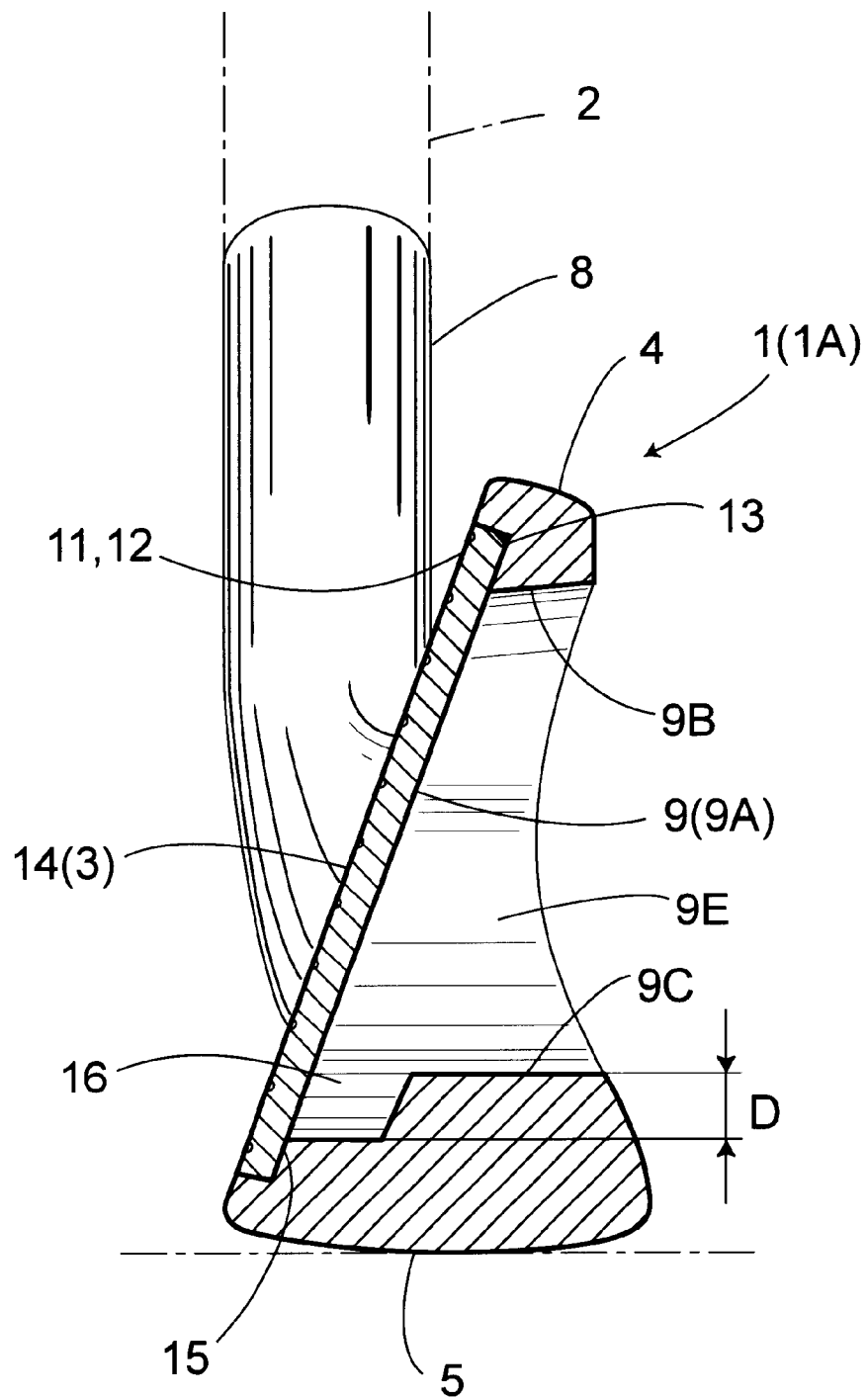
FIG. 9 is a section showing a second embodiment of the invention.

As shown in FIG. 8, the undercut portion 16 is formed on the head body 1A, at the same time that the cavity 9 and the aperture 11 are formed thereon. The undercut portion 16 is processed, using a certain mechanical processing unit 10 such as a machining tools or grinding tools including an endmill, a drill bit as illustrated in FIG. 8 and a turning machine, in which the processing unit 20 is inserted into the aperture 11 from a front side, thereby machining or grinding the front side of the inner lower surface 9C.

Figure 10A:
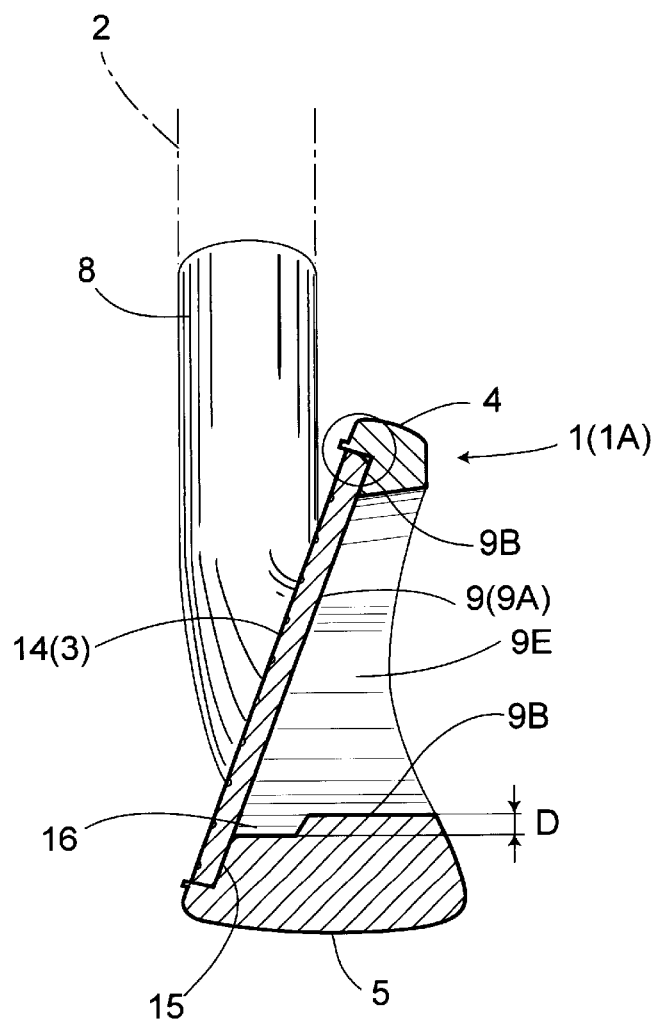
FIG. 10a is a section showing a golf club which is under welding process in accordance with a second embodiment of the invention, while FIG. 10b a partially enlarged section thereof.
Figure 10B:
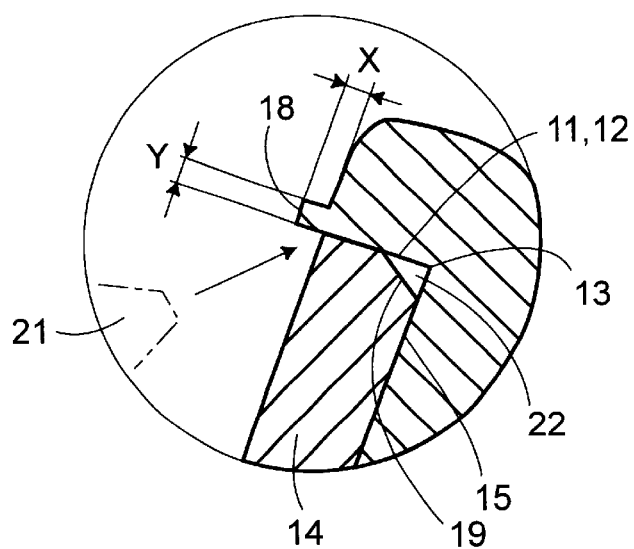

Further, the face plate 14 is secured to the head body 1A thus formed with the undercut portion 17, by means of laser beam welding. As illustrated in FIGS. 5, 6, 7, 10a and 10b, a small protrusion 18 is formed in advance along either an entire or a part of the peripheral portion 12 of the aperture 11. In a preferred form of the invention, the small protrusion 18 is formed in advance on the top side and the sole side only, as illustrated in FIGS. 10a and 10b. The small protrusion has a height of 1 mm or below, preferably about 0.8 mm, and a width of 1 mm or below, preferably 0.5 mm. On the other hand, the rear edge of the face plate 14 is formed in advance with a beveled portion 19 with an oblique line of about 0.5 to 1.5 mm length so that it may be inclined at a preset angle of elevation of 45 degrees or above, or at 80 degrees, for example.

After fitting the face plate 14 into the aperture 11, the laser beam welding is carried out by directing a head 21 of a laser welding machine toward the edge 12 of the aperture 11. At this time, the middle portion of the welded portion swells while the both ends thereof sink due to being attracted toward the middle portion by the welding heat, but the protrusion 18 also is fused, and thus the fused metal from the protrusion 18 is allowed to flow into the sinking portion, thereby preventing the welded portion from producing such sinking portion. Further, whilst the laser beam irradiation is carried out from a front side at the time of welding, a clearance 22 is formed between the face plate 14 and the bottom surface 15 by forming the aforesaid beveled portion 19 on the rear surface of the face plate 14, and thus, a relief space for bubbles generated during the laser beam welding is insured, said bubbles being able to escape through the relief space by means of the penetration welding relative to the partially thinned portion.

The aforesaid laser beam welding may be carried out at for example 450 W output, 250 mm/minute velocity, 30 pps pulse frequency, about 1.5 to 1.6 mm depth of penetration. In the meantime, the configuration and angle of the aforesaid beveled portion 19 may be modified as long as it serves to form a clearance 22.

As is apparent from the foregoing, a golf club according to the foregoing embodiment comprises the inner lower surface 9C of the cavity 9 formed with the undercut portion 16 defined toward the sole 5, corresponding to a third aspect of the invention. The deepest portion of the undercut portion 16 defines a depth D of 7 mm or above, thereby making the center of gravity deeper, enlarging a sweet area, so that there can be provided a golf club which enables golf balls to be more easily raised. Further, as the undercut portion 16 is disposed at the face 3 side on the inner lower surface 9C of the cavity 9, metal portions closer to the face 3 are removed, thereby enabling the bending of the face 3 in an effectively resilient manner.

Furthermore, according to a fourth aspect of the invention, there is provided a method for manufacturing a golf club, said golf club comprising: the face member 14; the head body 1A having the aperture 11 on a front for securing the face member 14 thereto, the cavity 9 formed on a rear face thereof and the shaft attachment portion 8 provided at one end thereof; and the shaft 2 connected to the head body 1A, said method comprising the steps of:

inserting the mechanical processing unit 20 from a front side of the head body 1A into the aperture 11, thus forming the inner lower surface 9C of the cavity 9 to the undercut configuration to thereby form the undercut portion 16; and then, securing the face member 14 to the aperture 11 by means of laser beam welding, whereby the mechanical processing unit 20 can be inserted deep into the aperture 11 without being disturbed by other portions when forming the undercut portion 16, and thus the degree of freedom with respect to machine processing can be enhanced and the undercut portion 16 can be formed deeper. As a result, the configuration and area of the face 3 are subjected to no restrictions associated with the forming of the undercut portion 16.

Moreover, according to a fifth aspect of the invention, there is provided a method for manufacturing a gold club, said method comprising the steps of:

forming the head prototype 17 by forging a raw material so that the head prototype 17 may comprise the prototypical face 3A and the prototypical cavity 9B;

hollowing the face 3A from the head prototype 17, then processing the hollowed face 3A to the face plate 14;

providing the aforesaid aperture 11 in the resultant hollow portion, while forming the undercut portion 16 in the aforesaid cavity 9B; and then, securing the face plate 14 to the aperture 11 by means of laser beam welding.

Thus, even though the head 1 is constructed of a single material, yet the mechanical processing unit 20 can be inserted deeply by hollowing the face 3A without being disturbed by other portions at the time of processing the undercut portion 16, thereby enhancing the degree of freedom with respect to machine so as to form the undercut portion 17 still deeper. As a result, the configuration and area of the face 3 are not restricted by the forming of the undercut portion 16.

Also, according to a further aspect of the invention, there is provided a method for manufacturing a golf club with one of the foregoing structures, in which the head body is formed by forging. Thus, so-called grain flows are formed by the forging so that metal tissues are made denser, thereby improving the strength of the golf club, also enabling the adjustment of loft angles and lie angles thereof.

Also, according to a further aspect of the invention, there is provided a method for manufacturing a golf club, said golf club comprising the head 1 having the face 3 on a front and the shaft attachment portion 8 provided at one side; and the shaft 2 connected to the head 1, said head 1 being formed by combining a plurality of members such as the head body 1A and the face member 14, said method comprising the steps of:

forming the protrusion 18 on an entire or a part of the peripheral portion 12 of the member that is to be laser welded; and securing the face member 14 to the head body 1A by means of laser welding, whereby even though the welded portion sink due to being attracted by the welding, the fused metal from the protrusion 18 can fill such sinking portion, thereby enabling the preventing of the sinking portion. Specifically, with the protrusion 18 which has a height X of 1 mm or below, preferably about 0.8 mm, and a width Y of 1 mm or below, preferably 0.5 mm, the protrusion 18 thus can be fused without failures, free from the laser being out of focus. If the protrusion 18 is of a larger dimension than this, the laser is no longer in focus, and thus the protrusion 18 is unlikely to be fused sufficiently.

Still further, according to a further aspect of the invention, there is provided a method for manufacturing a golf club, said golf club comprising: the head 1 having the face 3 on a front and the shaft attachment portion 8 provided at one side; and the shaft 2 connected to the head 1, said head 1 being formed by combining a plurality of members such as the head body 1A and the face plate member 14, said method comprising the steps of:

forming the beveled portion 19 on the rear surface of the face plate member 14 that is to be laser welded; and securing the face plate member 14 to the head body 1A by means of laser welding, whereby the clearance 22 is formed between the face plate 14 and the bottom surface 15, and thus, a relief space for bubbles generated during the laser beam welding is insured, said bubbles being able to escape through the relief space without being confined within the welded portion, by means of the penetration welding relative to the resultant partially thinned portion. Consequently, as so-called pinholes are not formed on the welded portion, better welding can be performed. Moreover, as such pin holes do not appear on the welded part even after polishing, a golf club can be polished to a beautiful final product.

In the meantime, in the foregoing embodiments is illustrated the use of laser beam welding for securing the face member 14 to the head body 1A. The reason why the laser beam welding is preferred, is that as contrasted to TIG welding, the laser beam welding causes a less heat-affected zone, and thus it can be used for materials susceptible to heat as well, and that it causes less distortions, needs no welding rods so that it can be easily automated, and is capable of performing a better welding due to its V-shaped welding part. Further, as laser beam is an electromagnetic wave, it can propagate in the air without the attenuation of energy and the deterioration of optical characteristics, also without restrictions to working atmosphere, and furthermore, light-concentration and change of the direction can be carried out, using optical instruments such as lens and mirrors. Moreover, as it is not affected by the electromagnetic field, there are no restrictions to working jigs, while both metals and non-metals can be worked by the laser beam welding, without any X-ray radiation generated from a base material. In this respect, an electronic beam welding requires a vacuum surroundings in principle, and thus there are problems in respect of facilities and workability. As above mentioned, TIG welding causes such a large heat-affected zone that considerable distortions are resulted, and that it is too time-consuming due to manual operation, resulting in unstable bead lines. According to laser beam welding, however, welding can be automated through a welding automating programming, using a laser welding machine, and thus costs can be reduced as compared to TIG welding.

Figure 11:
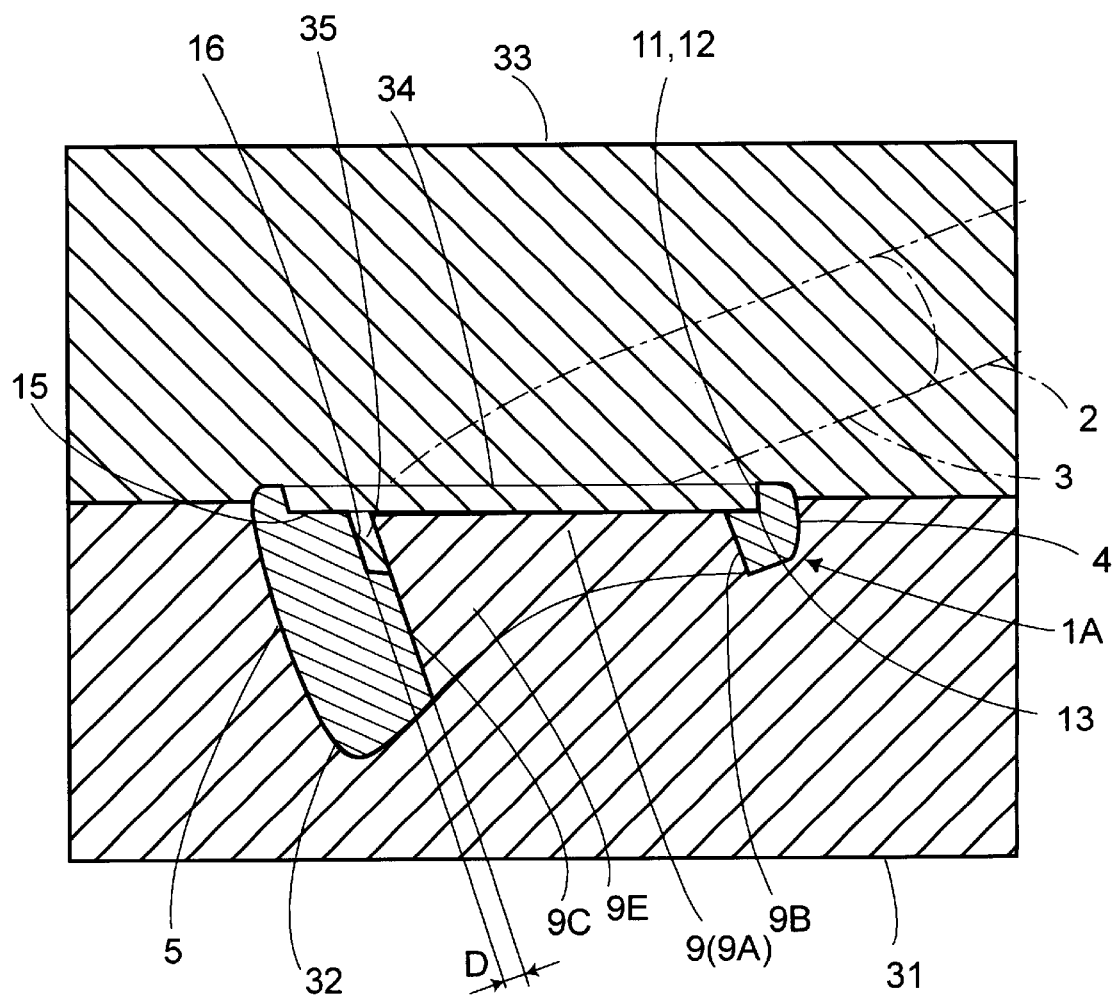
FIG. 11 is a section showing a third embodiment of the invention.

Next, a third embodiment of the invention is described with reference to FIG. 11, in which the same portions as those described in the foregoing embodiments are designated by the same reference numbers, and their repeated descriptions are omitted.

In this embodiment, the head body 1A preliminarily formed with the aperture 11 is formed by a cavity 32 of a first metallic mold 31 into which the head body 1A is accommodated. A second metallic mold 33 which mates with the first mold 31 is formed with a primary protrusion 34 for forming the aperture 11 and a secondary protrusion 35 for forming the undercut portion 16 by forging, said secondary protrusion 35 extending through the aperture 11. Thus, the head body 1A is accommodated into the cavity 32 of the first mold 31, which is mated with the second mold 33 and then pressure is applied thereto, whereby the aperture 11 is formed by the primary protrusion 34, at the same time that the undercut portion 16 can be formed by the secondary protrusion 35 which processes the inner lower surface 9C of the cavity 9.

As is apparent from the foregoing, the third embodiment provides a method for manufacturing a golf club according to a further aspect of the invention, in which the secondary protrusion 35 of the secondary mold 33 is allowed to extend from the aperture 11 of the head body 1A to thereby form the inner lower surface 9C of the cavity 9 to the undercut configuration, and then the face member 14 is secured to the aperture 11 by means of laser beam welding. Thus, the secondary protrusion 35 can be inserted deeply without being disturbed by other portions when processing the undercut portion 16, thereby enhancing the degree of freedom with respect to machine processing, enabling the undercut portion 16 to be formed deeper. Consequently, the configuration and area of the face 3 are not restricted by the forming of the undercut portion 16.

Next, fourth to sixth embodiments are explained with reference to FIGS. 12 to 14.

Figure 12A:
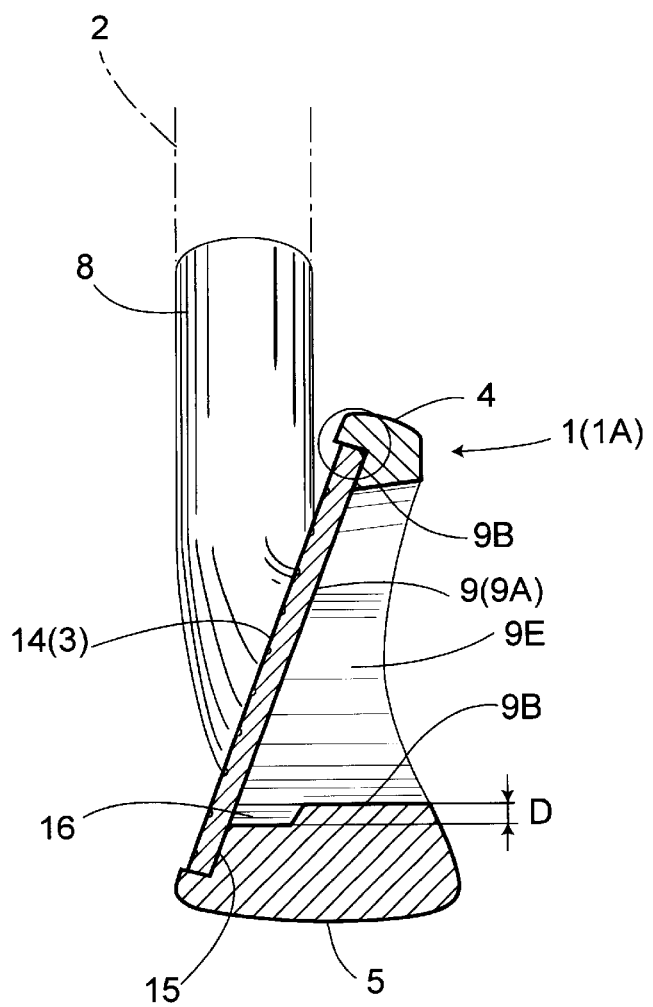
FIG. 12a is a section showing a fourth embodiment of the invention, while FIG. 12b a partially enlarged section thereof.
Figure 12B:
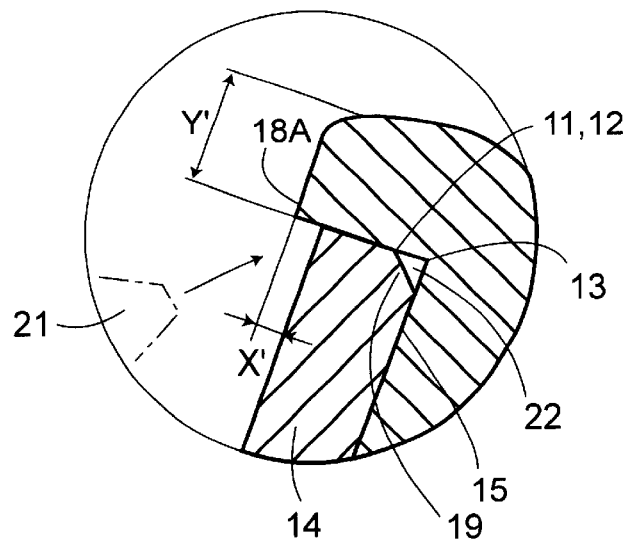

In a fourth embodiment as illustrated in FIGS. 12a and 12b, the face plate 14 is secured to the head body 1A which is formed with the said undercut portion 16, by means of laser beam welding. An entire or a part of the peripheral portion 12 of the aperture 11 is formed in advance with a protrusion 18A, said protrusion 18A being formed in this embodiment by making the head body 1A relatively thick at the top 4 and the sole 5 sides. Specifically, the protrusion 18A is so formed that it may protrude from the front surface of the face plate 14, being thickened from the upper part of the peripheral portion 12 to the top 4, and from the lower part thereof to the sole 5, respectively. The protrusion 18A has a height X' of 1 mm or below, preferably about 0.8 mm by which it protrudes from the front surface of the face plate 14, while it has a width Y' defined from the peripheral portion 12 to the top 4 and the sole 5, as illustrated in FIG. 12b. The rear edge of the face plate 14 is formed in advance with the beveled portion 19 with an angle of elevation of 45 degrees or above, or 80 degrees, for example, having an oblique line being 0.5 to 1.5 mm long.

Then, the face plate 14 is fitted into the aperture 11, and thereafter, the laser beam welding is carried out by directing the head 21 of a laser welding machine to the edge 12 of the aperture 11. At that moment, the protrusion 18A also is melted, while the middle portion of the welded portion swells while the both ends thereof sink due to being attracted by heat. Nevertheless, the melted metal from the protrusion 18A is allowed to flow into the sinking portion, thereby preventing the producing of such sinking portion. Further, whilst laser beam irradiation is applied from the front surface in this welding process, as the clearance 22 is formed between the face plate 14 and the bottom surface 15 by forming the beveled portion 19, a relief space for bubbles generated during the welding to escape therethrough is insured, through the penetration welding relative to such partially thinned portion.

As is apparent from the foregoing, according to a further aspect of the invention, there is provided a method for manufacturing a golf club, said golf club comprising: the head 1 having the face 3 on a front and the shaft attachment portion 8 provided at one side; and the shaft 2 connected to the head 1, said head 1 being formed by combining a plurality of members such as the head body 1A and the face member 14, said method comprising the steps of:

forming the protrusion 18A on an entire or a part of the peripheral portion 12 of the head body 1A that is to be laser welded, said protrusion 18A protruding from the front surface of the face plate 13, having a thickness defined from the peripheral portion 12 to the top 4 and the sole 5,; and securing the face member 14 to the head body 1A by means of laser welding, whereby even though the welded portion sinks due to being attracted by the welding, the fused metal from the protrusion 18 can fill such sinking portion, thereby enabling the preventing of the sinking portion.

Likewise, in FIGS. 13a and 13b, showing a fifth embodiment of the invention, the face plate 14 is secured to the head body 1A which is formed with the said undercut portion 16, by means of laser beam welding. Specifically, an entire or a part of the peripheral portion of the face plate 14 is formed in advance with a protrusion 14A, said protrusion 14A being formed in this embodiment by making the thickness of the face plate 14 greater at the top 4 and the sole 5 sides. The protrusion 14A is so formed that it may protrude from the central front face of the face plate 14. The protrusion 14A has a height X" of 1 mm or below, preferably about 0.8 mm by which it protrudes from the central front surface of the face plate 14, while it has a width Y" of 1 mm or below, preferably about 0.5 mm, thereby ensuring the welding of the protrusion 14A without a likelihood of laser beam being out of focus. On the other hand, the rear edge of the face plate 14 is formed in advance with the beveled portion 19 with a preset angle of elevation of 45 degrees or above, or 80 degrees, for example, having an oblique line being 0.5 to 1.5 mm long.

Then, the face plate 14 is fitted into the aperture 11, and thereafter, the laser beam welding is carried out by directing the head 21 of a laser welding machine to the edge 12 of the aperture 11. At that moment, the protrusion 14A also is melted, while the middle portion of the welded portion swells and the both ends thereof sink due to being attracted by heat. Nevertheless, the melted metal from the protrusion 14A is allowed to flow into the sinking portion, thereby preventing the producing of such sinking portion. Further, whilst laser beam irradiation is applied from the front surface in this welding process, as the clearance 22 is formed between the face plate 14 and the bottom surface 15 by forming the beveled portion 19, a relief space for bubbles generated during the welding to escape therethrough is insured, through the penetration welding relative to such partially thinned portion.

As is apparent from the foregoing, according to a further aspect of the invention, there is provided a method for manufacturing a golf club, said golf club comprising: the head 1 having the face 3 on a front and the shaft attachment portion 8 provided at one side; and the shaft 2 connected to the head 1, said head 1 being formed by combining a plurality of members such as the head body 1A and the face plate 14, said method comprising the steps of:

forming the protrusion 14A on an entire or a part of the peripheral portion of the face plate 14 that is to be laser welded, said protrusion 14A protruding from the central front surface of the face plate 14; and securing the face plate 14 to the head body 1A by means of laser welding, whereby even though the welded portion sinks due to being attracted by the welding, the fused metal from the protrusion 14A can fill such sinking portion, thereby enabling the preventing of the sinking portion.

Figure 14A:
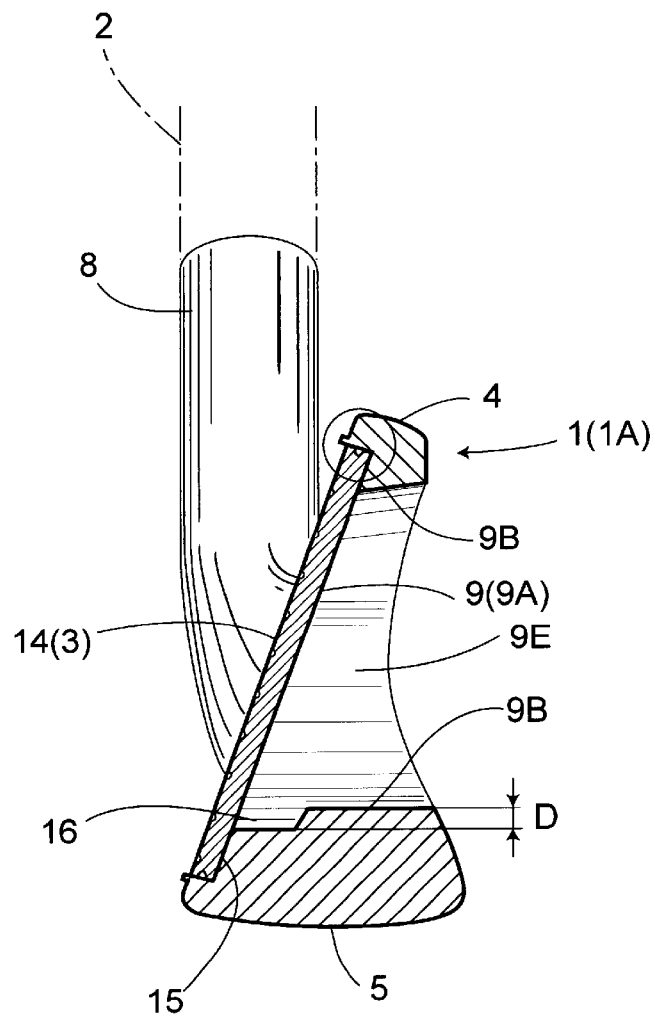
FIG. 14a is a section showing a sixth embodiment of the invention, while FIG. 14b a partially enlarged section thereof.
Figure 14B:
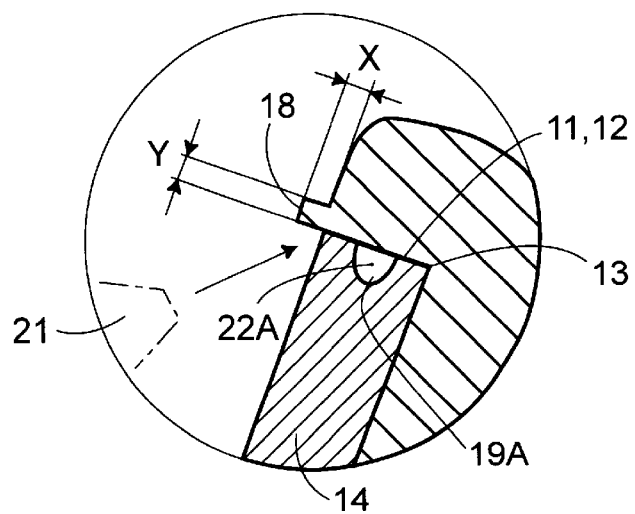

In FIGS. 14a and 14b showing a sixth embodiment of the invention, the side faces of the face plate 14 are formed in advance with a recess 19A. Then, the face plate 14 is fitted into the aperture 11, and thereafter, the laser beam welding is carried out by directing the head 21 of a laser welding machine to the edge 12 of the aperture 11. Whilst the laser beam irradiation is applied from the front side, as a clearance 22A is formed between the face plate 14 and the aperture 11 by forming the recess 19A on the side faces of the face plate 14, a relief space for bubbles generated during the welding to escape therethrough is insured, through the penetration welding relative to the partially thinned portion. It should be noted that the recess 19A may be shaped in various manners, as long as it serves to form the clearance 22A.

As is apparent from the foregoing, in the sixth embodiment of the invention, there is provided a method for manufacturing a golf club, said golf club having the head 1 formed by combining a plurality of members such as the head body 1A and the face plate 14, said method comprising the steps of:

forming the recess 19A on the side faces of the face plate 14 that is to be laser welded; and securing the face plate 14 to the head body 1A by means of laser welding, whereby the clearance 22A is formed between the face plate 14 and the head body 1A, and thus, a relief space for bubbles generated during the laser beam welding is insured, said bubbles being able to escape through the relief space without being confined within the welded portion, by means of the penetration welding relative to the resultant partially thinned portion. As a result, pin holes are not formed on the welded portion, which thus attains a better welding, and a golf club can be polished to a final product with a beautiful appearance, which is free from pin holes resulting from the confined bubbles.

Incidentally, the present invention should not be limited to the foregoing embodiments, but may be variously modified within a scope of the invention.

Figure 15:
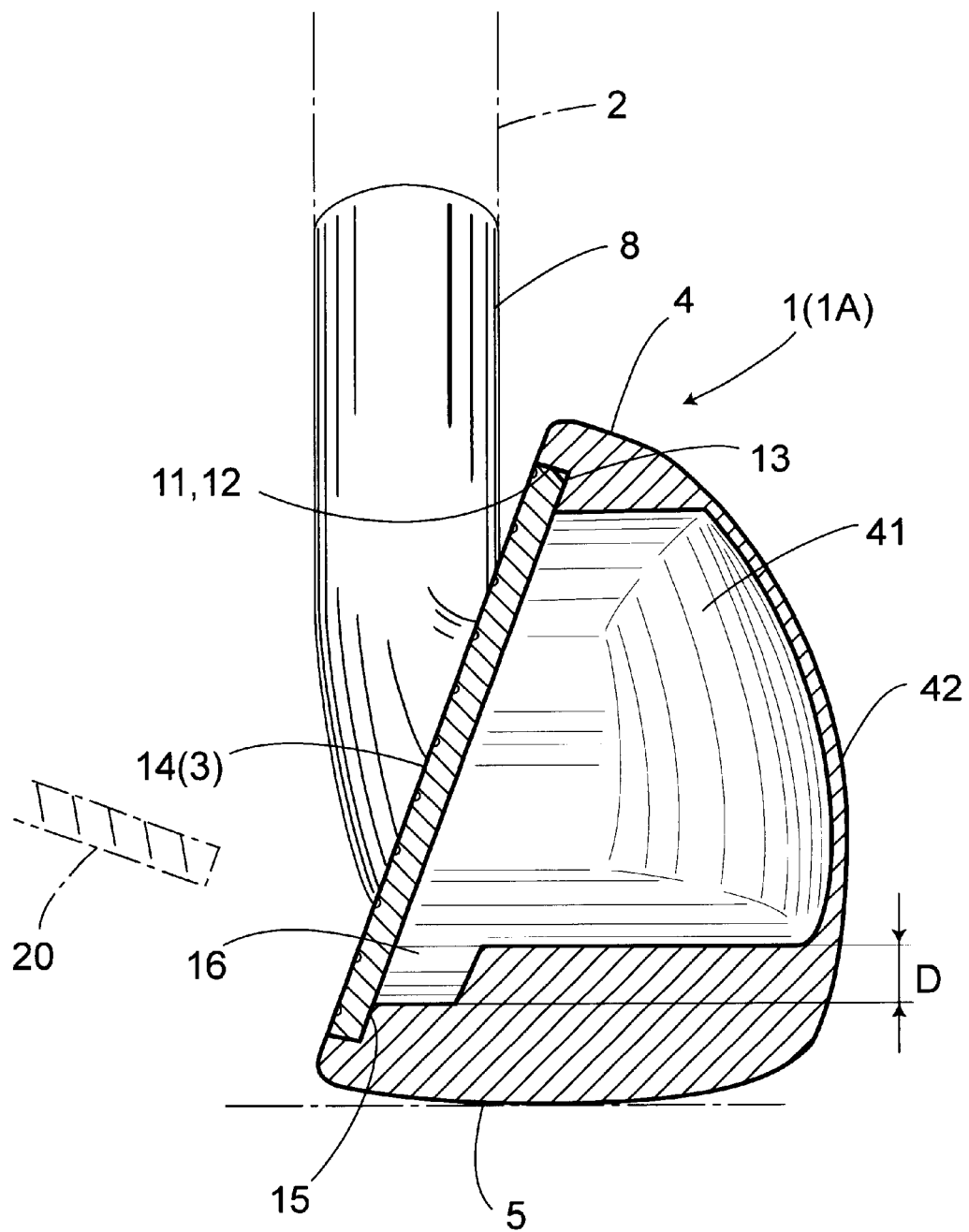
FIG. 15 is a section showing a sixth embodiment of the invention

For example, as illustrated in FIG. 15, the present invention may apply to a so-called hollow-type iron golf club in which a rear shell 42 is formed integrally with the rear surface of the head body 1A with a hollow interior 41 defined therebetween. In the case of such hollow-type iron golf club, there can be provided a method for manufacturing a golf club according to a fourth aspect of the invention, said golf club comprising: the face member 14; the head body 1A having the aperture 11 on a front for securing the face member 14 thereto, the hollow interior 41 on a rear and the shaft attachment portion 8 provided on one side; and the shaft 2 connected to the head body 1A, said method comprises the steps of:

inserting the mechanical processing unit 20 from the front side of the head body 1A through the aperture 11 to form the hollow interior 41 which makes up a part of the head body 1A; and then, securing the face member 14 to the aperture 11 by means of laser beam welding.

Thus, the machine processing unit 20 can be inserted deeply without being disturbed by other portions when processing the hollow interior 41, thus enhancing the degree of freedom with respect to machine processing, enabling the hollow interior to be formed deeper.

Figure 16:
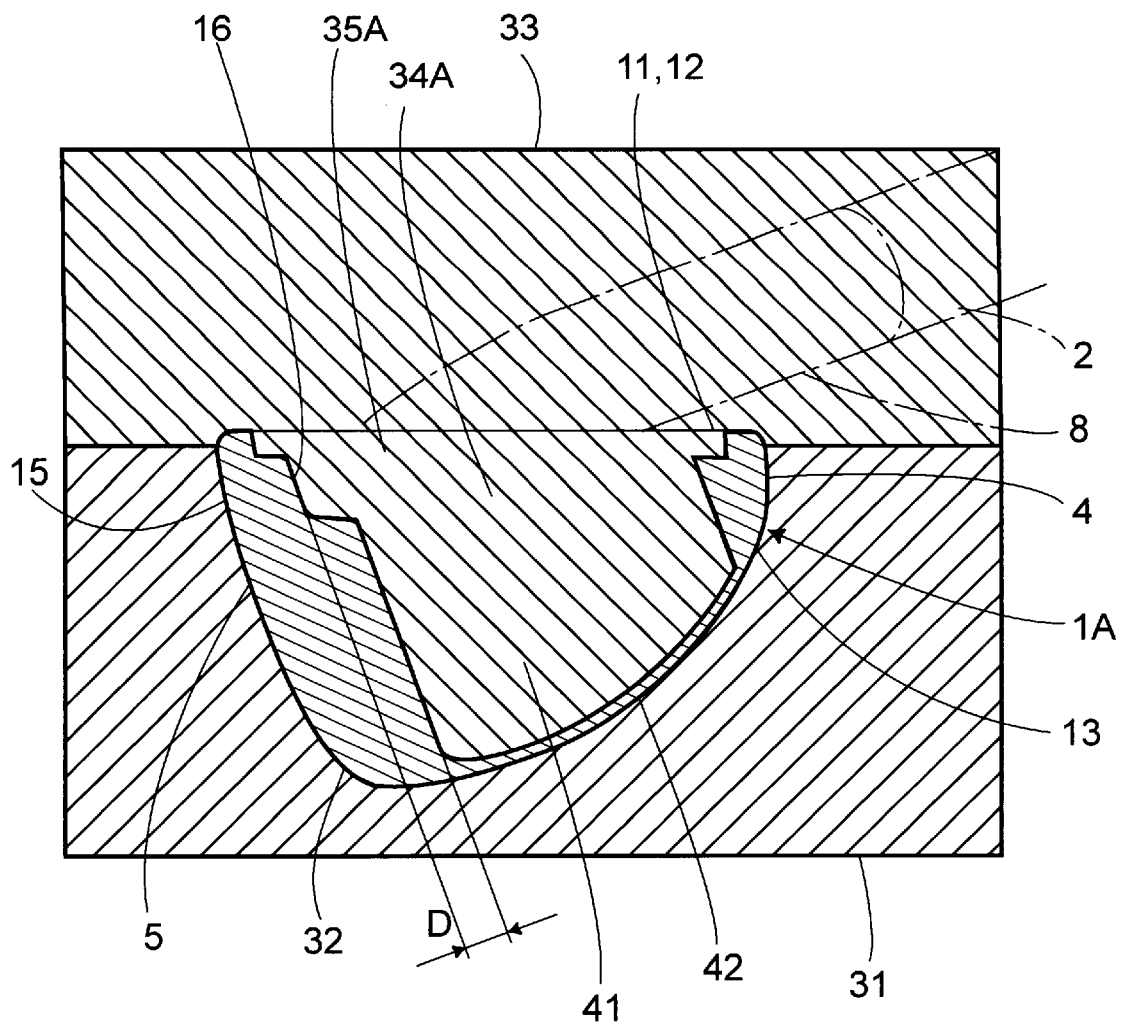
FIG. 16 is a section showing a seventh embodiment of the invention

Further, for another hollow-type iron golf club as illustrated in FIG. 16, there can be provided a method for manufacturing a golf club according to a sixth aspect of the invention, said method comprises the steps of:

inserting a secondary protrusion 34A and primary protrusion 35A of the secondary mold 33 from the aperture 11 side of the head body 1A through the aperture 11 to thereby form the hollow interior 41 and the undercut portion 16; and then, securing the face member to the aperture 11 by means of laser beam welding.

Thus, the secondary protrusion 35A can be inserted deeply without being disturbed by other portions when processing the hollow interior 41, thus enhancing the degree of freedom with respect to machine processing, enabling it to be formed deeper.

Alternatively, the use of other welding means such as TIG welding should not be excluded from the scope of the invention. Further, other securing means than welding, such as bonding and press-fitting may be employed.

Figure 17:
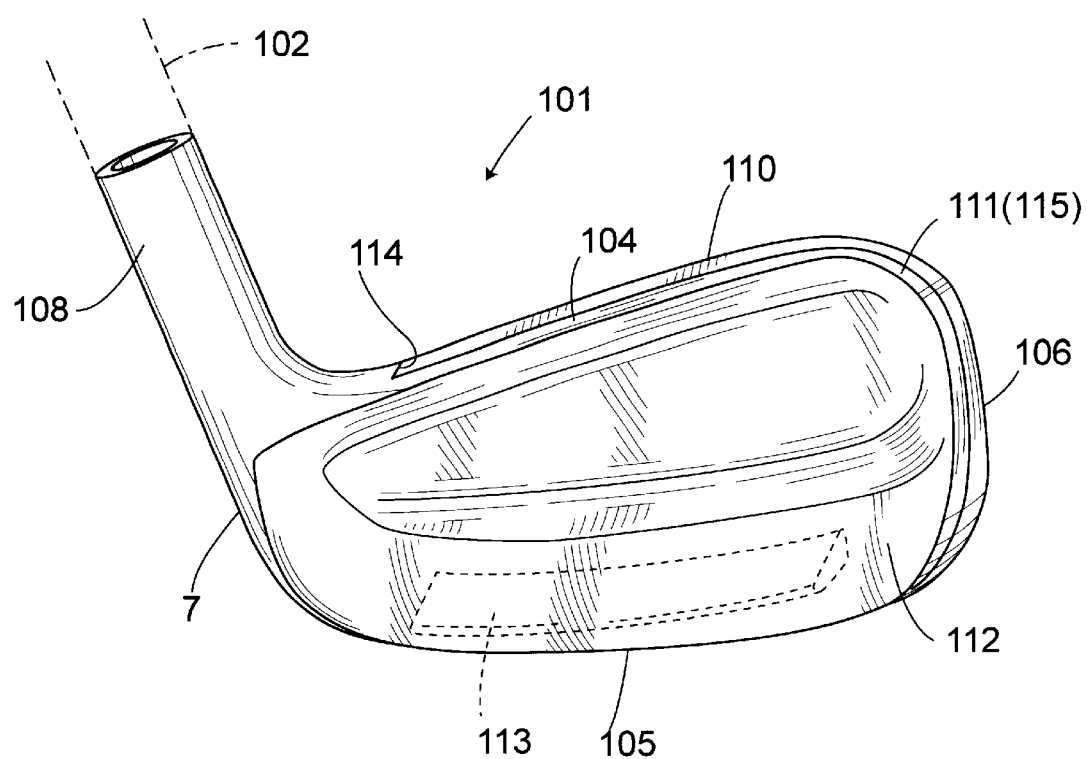
FIG. 17 is a rear view illustrating a golf club according to an eighth embodiment of the present invention.
Figure 18:
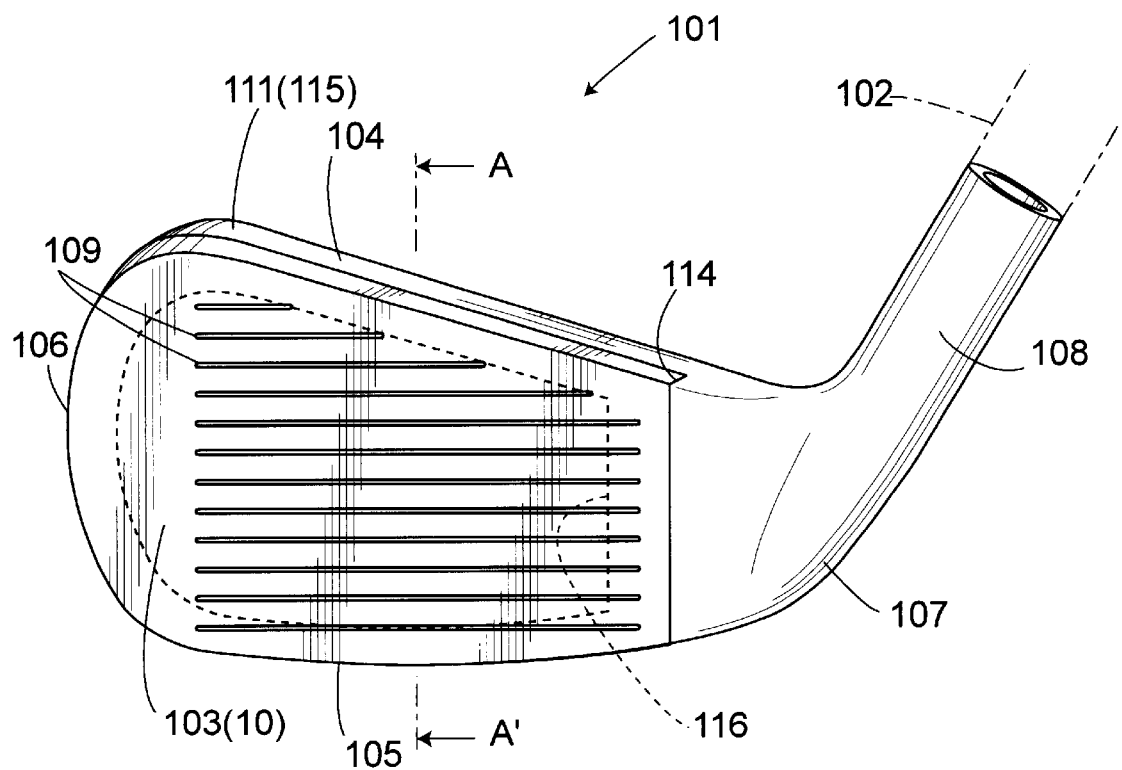
FIG. 18 is a front view illustrating a golf club according to the eighth embodiment of the present invention.
Figure 19:
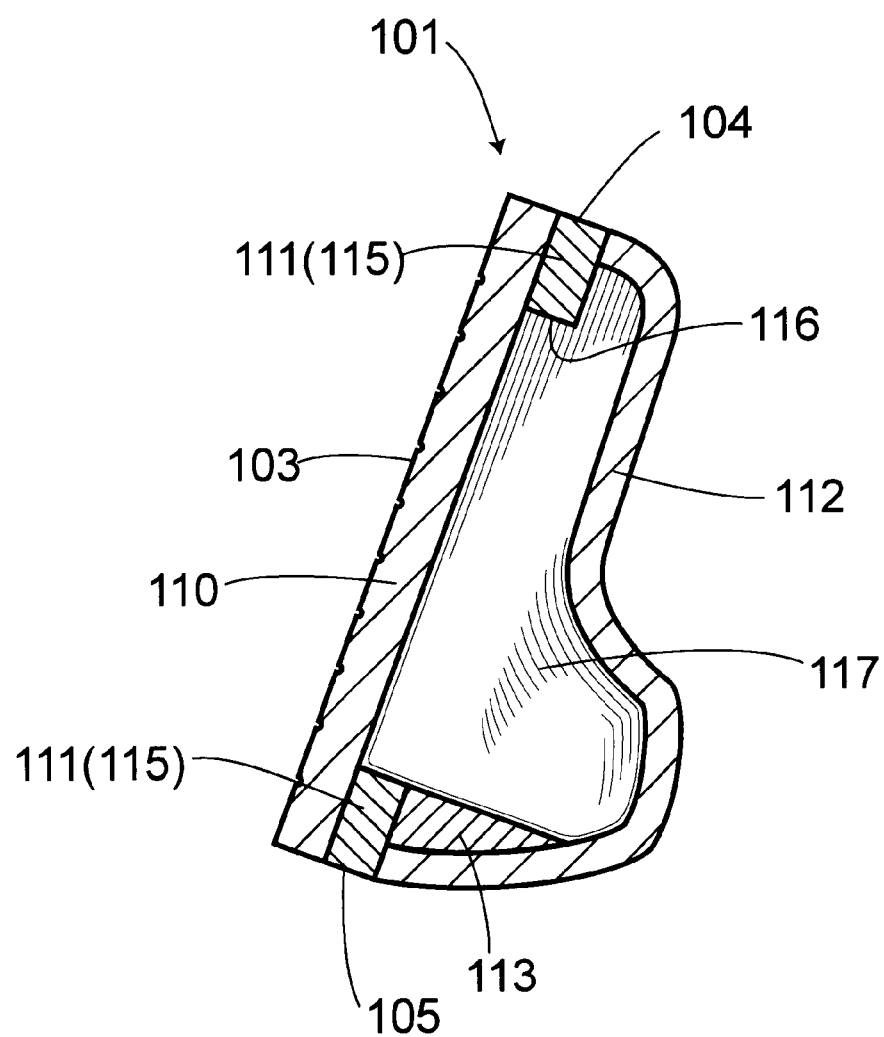
FIG. 19 is a cross-sectional view taken on line A–A' of FIG. 18 illustrating a golf club according to the eighth embodiment of the present invention.
Figure 20:
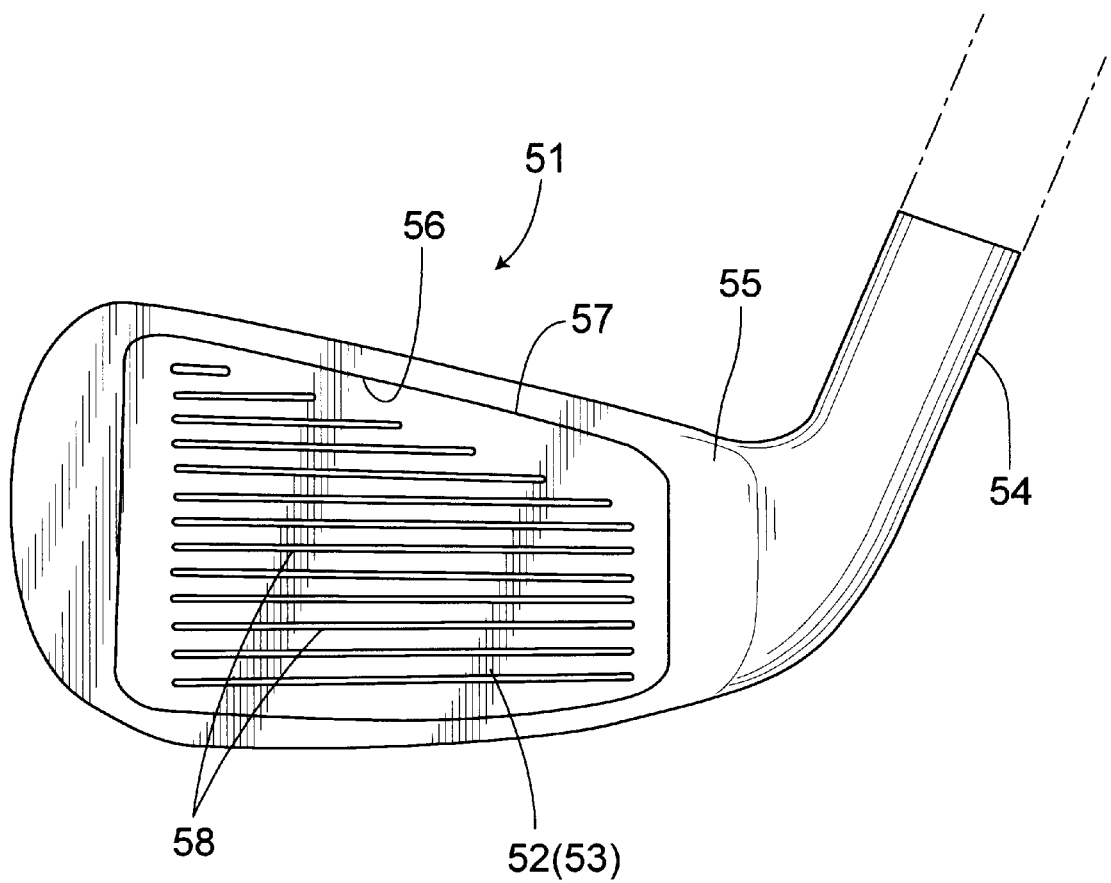
FIG. 20 is a front view illustrating prior art.

Next, an eighth embodiment will be described with reference to FIGS. 17 to 19. FIG. 17 to FIG. 19 show an iron golf club, which is provided with a head 101 and a shaft 102. The head 101 is formed with a face 103 for hitting golf balls (not shown in the drawings) on a front surface, a top 104 on an upper portion of the face 103, a sole 105 on a lower portion thereof, a toe 106 on one side, and a heel 107 on the other side. Further, a shaft connecting portion 108 referred to as a hosel or the like is provided, protruding obliquely upward from an upper portion of the heel 107, while a lower end of the shaft 102 is connected to the shaft connecting portion 108. In the meantime, numeral 109 denotes lateral grooves called score lines formed on the face 103.

The head 101 is constructed by joining a face portion 110, a head body 111, a rear shell 112 and a balance weight 113 together by means of welding. The face portion 110 for forming the face 103 is formed from a plate material of spring steel (SUP-10) of an approximately uniform thickness, having a tabular shape and about 2.5 mm thickness. The head body 111 is formed from low-carbon steel (S20C), including the shaft connecting portion 108 on the other side, a step portion 114 on a front surface corresponding to the face portion 110, and a frame portion 115 corresponding to a rear peripheral surface of the face portion 110. Further, the frame portion 115 is provided with a through hole 116 penetrating from front through back, while the face portion 110 is joined to the frame portion 115 with a front surface of the frame portion 115 abutting against only the rear peripheral surface of the face portion 110. In the meantime, the step portion 114 abuts against an edge surface of the face portion 110 without a gap while the face portion 110 is joined to the head body 111 by welding the peripheral portion of the head body 111.

The rear shell 112 is formed from a plate material of low-carbon steel (S50C) having an approximately 2.0 mm uniform thickness to form a rear surface of the head 101. The rear shell 112 abuts against a rear peripheral surface of the frame portion 115 to be joined thereto, thereby forming a hollow portion 117 inside the head 101, together with the face 110 and the head body 111. The rear shell 112 forms almost an entire portion of the rear surface of the head 101 ranging from the top 104 to the sole 105. The rear shell 112 is formed such that the head 101 takes a wider shape at the sole 105 side than at the top 104 side. The balance weight 113 is made from general purpose steel (SS400), which is joined to the hollow portion 117 side of the rear shell 112.

Among the above-mentioned steel materials, the spring steel (SUP-10) for forming the face 110 is the highest in strength, having a tensile strength of 1,226 Mpa or more after hardening and tempering. Low-carbon steel (S50C) for forming the rear shell 112 is the second highest in strength, having a tensile strength not less than 735 Mpa. Incidentally, low-carbon steel (S20C) for forming the head body 111 is comparatively soft, having a tensile strength of 400 Mpa or above.

Next is a description of manufacturing methods.

In the first place, the outline of the face 103 is punched out from a plate material of spring steel (SUP-10) of 2.5 mm thickness, using a metal stamp so that the face 110 is formed. On the other hand, a prototype (not shown in the drawings) of the head body 111 is formed from a metal material (not shown in the drawings) of low-carbon steel (S20C) by hot forging, using a metal mold. At this moment, a portion corresponding to the frame portion 115 remains tabular. Thereafter, the step portion 114 is formed by cutting process and the through hole 116 is formed by punching process using a metal stamp so that the frame portion 115 is formed. Then, the face 110 is joined to the front surface of the frame portion 115 by means of welding. In the meantime, at the time of the joining step, the joint portion in a peripheral portion of the head body 111 is welded to join the face portion 110 thereto with the step portion 114 abutting against an edge of the face portion 110 without a gap.

Next, a plate material of low-carbon steel (S50C) of 2.0 mm thickness is heated to form the rear shell 112 by drawing process utilizing a metal mold. On the other hand, the balance weight 113 is formed from general purpose steel (SS400) through cold working utilizing a metal mold. The balance weight 113 thus formed is then joined to the rear shell 112 on the hollow portion 117 side by means of welding. Then, the rear shell 112 is joined to the rear peripheral surface of the frame portion 115 by welding.

In a preferred form of the invention, when joining the face portion 110, the head body 111, the rear shell 112 and the balance weight 113 one another, laser welding may be performed utilizing a laser processing machine, as the face portion 110 and the rear shell 112, among others, are so thin that they are prone to be deformed by heat. Laser welding has such advantages that it causes less thermal effect to welding objects so that the thermal distortion of the objects can be minimized, enabling the welding between different kinds of metals, requiring no welding rod, making it possible to automate the welding process through automating programming.

Thereafter, the head 101 is allowed to undergo heat treatment by quenching and tempering so as to adjust the strength and toughness thereof, which is further subjected to grinding and plating process to be finished.

In the meantime, shotpeening may be applied to the spring steel used for the face portion 110 in order to enhance its fatigue strength, as such treatment is recognized as useful for that purpose. However, it is necessary to pay attention not to cause deflection by the stress developed at the time of shotpeening as the face portion 110 of the present embodiment is such a thin member.

According to the foregoing embodiment of the invention, there can be provided a golf club with hollow construction, which has a lowered center of gravity while retaining such hollow structure advantages such as a large moment of inertia and a deep position of the center of gravity. In other words, it is possible to provide a golf club which has an enlarged sweet area and allows golf balls to be raised more easily so that a miss hit caused by hitting an off-center spot leads to a less likelihood of unsuccessful consequence, thus providing a golf club easy to use for beginners. Beside, as the frame portion 115 and the shaft connecting portion 108 are integrated to form the head body 111, it is possible to determine the respective values of a loft angle and a lie angle to a certain extent in advance when forming the head body 111.

Further, as said face portion 110 and said rear shell 112 are formed from materials having higher strength than that of said head body 111, the face portion 110 and the rear shell 115 are able to be formed thin so that the weight thus saved can be distributed to other portions of the head 101, thus enabling the provision of a golf club with enhanced flexibility in designing the head 101 and with high performance. Further, spring effect of the face portion 110 at the time of hitting golf balls is enhanced by forming the face portion 110 thin, thereby being able to improve resilient performance of the face portion 110. Moreover, the head body 111 is lower in strength than other portions so that it can be easily bent, thus enabling the easy adjustment of a loft angle and a lie angle.

Further, according to the present embodiment, the thickness of said rear shell 112 is nearly uniform and is thinner than that of said face portion 110, while said rear shell 112 is formed from said top 104 of a rear surface of said head 101 to said sole 105. Therefore, flexibility in weight distribution of the head 101 can be enhanced through forming the rear shell 112 thinner, while the rear shell 112 is formed from the top 104 of the rear surface of the head to the sole 105, so that the rear surface of the head 101 can be improved in appearance.

Still further, a golf club of the present embodiment is one with the shaft 102 connected to the head 101 which is provided with the face 103 on the front surface and the shaft connecting portion 108 on one side, in which said head 101 comprises the face portion 110 forming said face 103 and the head body 111 joined to a rear surface of the face portion 110, while said face portion 110 and said head body 111 are joined together by welding a peripheral portion of said head body 111 so that a portion, where the face portion 110 of the head body 111 is joined, can be machined only by a plane milling cutting process, allowing easy machining, which can enhance degree of machining accuracy with ease so that no joint gap is formed at a portion where the face portion 110 abuts against the head body 111. Moreover, as the portion where the face portion 110 and the head body 111 are joined by means of welding does not lie on the face surface 103 but on the peripheral portion of the head body 111, there can be provided a golf club which is free from constraints on an area for forming score lines 9 and the face 103 can have an excellent appearance.

In the meantime, although an iron golf club is described as an example in the aforementioned embodiment, the present invention should not be limited to an iron golf club but may be applied to a wood golf club as well. Further, the kind of spring steel for forming the face portion 110 should not be limited to SUP10 but may be other kind of spring steel. The material of the head body 111 should not be limited to S20C but may be other iron-based material, stainless steel, titanium-based alloy or the like.

Although all the components of the head are formed from iron-based materials in the aforementioned embodiments, other different kinds of materials may be used for each component of the head. For example, if the head body, the face portion and the rear shell are formed from lighter materials such as titanium, titanium alloy or the like while the balance weight is formed from denser material such as tungsten or the like, it becomes possible to more effectively adjust the center of gravity, thus enabling various modified embodiments.

What is claimed:

1. A method for manufacturing a golf club, said golf club comprising: a face member; a head body having an aperture on a front surface for securing the face member thereto, a cavity formed on a rear surface and a shaft attachment portion at one side; and a shaft connected to the head body, said method comprising:

inserting a mechanical processing unit from a front side of said head body through the aperture to process an inner lower surface of the cavity to form an undercut portion formed by concaving a front side of the inner surface downwards; and then, securing the face member to the aperture by laser beam welding.

2. A method for manufacturing a golf club, said golf club comprising: a face member, a head body having an aperture on a front surface for securing the face member, a hollow interior on a rear and a shaft connected to the head body, said method comprises:

inserting a mechanical processing unit from a front side of the head body through the aperture to form an undercut portion by concaving a front side of an inner lower surface of said hollow interior downwards; and then, securing the face member to the aperture by laser beam welding.

3. A method for manufacturing a golf club, said golf club comprising a head and a shaft connected to the head, said head being provided with a face on a front surface and a shaft connecting portion on one side, said method comprising:

joining a face portion that is to form said face to said head body by laser welding a peripheral edge portion of said head body, said head body including said shaft connecting portion and a frame portion that is to be joined to a peripheral rear edge of the face portion;

joining a rear shell to a balance weight by laser welding, said rear shell being joined to a peripheral rear edge of said frame portion to define a hollow portion together with said face portion and said head body, while said balance weight being joined to said rear shell on said hollow portion side; and joining said rear shell to said head body by laser welding a peripheral rear edge of said head body.

4. A method for manufacturing a golf club according to claim 3, wherein said face portion and rear shell are formed from a material which has a higher strength than that of said head body.

5. A method for manufacturing a golf club according to claim 3, wherein said face portion is formed from spring steel, while said head body and rear shell are formed from low carbon steel.

* * * * *